United States Patent
Chawla et al.

(10) Patent No.: US 11,506,764 B2
(45) Date of Patent: Nov. 22, 2022

(54) SYSTEM AND METHODS FOR RANGING OPERATIONS USING MULTIPLE SIGNALS

(71) Applicant: Beijing Voyager Technology Co., Ltd., Beijing (CN)

(72) Inventors: Vipul Chawla, Mountain View, CA (US); Yue Lu, Mountain View, CA (US); Yibo Yu, Burlingame, CA (US)

(73) Assignee: Beijing Voyager Technology Co., Ltd., Beijing (CN)

( * ) Notice: Subject to any disclaimer, the term of this patent is extended or adjusted under 35 U.S.C. 154(b) by 916 days.

(21) Appl. No.: 16/232,979

(22) Filed: Dec. 26, 2018

(65) Prior Publication Data

US 2020/0209362 A1  Jul. 2, 2020

(51) Int. Cl.
| | |
|---|---|
| *G01S 7/48* | (2006.01) |
| *G01S 7/4865* | (2020.01) |
| *G01S 7/484* | (2006.01) |
| *G01S 17/10* | (2020.01) |
| *G01S 7/481* | (2006.01) |
| *G01S 17/931* | (2020.01) |

(52) U.S. Cl.
CPC .......... *G01S 7/4865* (2013.01); *G01S 7/484* (2013.01); *G01S 7/4815* (2013.01); *G01S 17/10* (2013.01); *G01S 17/931* (2020.01)

(58) Field of Classification Search
None
See application file for complete search history.

(56) References Cited

U.S. PATENT DOCUMENTS

| | | | |
|---|---|---|---|
| 5,760,887 | A | 6/1998 | Fink et al. |
| 5,896,425 | A | 4/1999 | Hirano et al. |
| 6,115,113 | A | 9/2000 | Flockencier |
| 6,259,514 | B1 | 7/2001 | Yoshida |

(Continued)

FOREIGN PATENT DOCUMENTS

| | | |
|---|---|---|
| CN | 108089201 A | 5/2018 |
| EP | 2541274 A2 | 1/2013 |

OTHER PUBLICATIONS

U.S. Appl. No. 16/232,973, "Corrected Notice of Allowability", dated Oct. 2, 2019, 2 pages.

(Continued)

*Primary Examiner* — Hovhannes Baghdasaryan
(74) *Attorney, Agent, or Firm* — Kilpatrick Townsend & Stockton LLP

(57) ABSTRACT

Method and system for performing ranging operation are provided. In one example, a transmitter is configured to transmit a first signal having a first signal level and a second signal having a second signal level, the second signal being transmitted after the first signal, the first signal and the second signal being separated by a time gap configured based on a minimum distance of a range of distances to be measured by the LiDAR module. The first signal level and the second signal level are configured based on the range of distances to be measured by the LiDAR module, a range of levels of reflectivity of a target object to be detected by the LiDAR module, and a dynamic range of a receiver circuit to receive the first signal and the second signal. Ranging operation can be performed based on the time-of-flight of at least one of the first signal or the second signal.

20 Claims, 12 Drawing Sheets

(56) References Cited

U.S. PATENT DOCUMENTS

| | | | |
|---|---|---|---|
| 9,304,154 | B1 | 4/2016 | Droz et al. |
| 10,473,769 | B2 | 11/2019 | Shinozuka et al. |
| 10,473,770 | B1 | 11/2019 | Zhu et al. |
| 2009/0273770 | A1* | 11/2009 | Bauhahn ................ G01S 17/10 356/5.01 |
| 2015/0319422 | A1 | 11/2015 | Fereyre et al. |
| 2015/0331107 | A1 | 11/2015 | Galera et al. |
| 2016/0003946 | A1 | 1/2016 | Gilliland et al. |
| 2016/0047900 | A1 | 2/2016 | Dussan |
| 2017/0090019 | A1 | 3/2017 | Slobodyanyuk et al. |
| 2017/0153319 | A1 | 6/2017 | Villeneuve et al. |
| 2018/0031703 | A1 | 2/2018 | Ngai et al. |
| 2018/0074196 | A1 | 3/2018 | Weinberg |
| 2018/0123611 | A1 | 5/2018 | Dutton et al. |
| 2018/0259625 | A1 | 9/2018 | Gnecchi et al. |
| 2018/0259627 | A1 | 9/2018 | Shinozuka et al. |
| 2018/0259645 | A1 | 9/2018 | Shu et al. |
| 2021/0286082 | A1 | 9/2021 | Ohki |

OTHER PUBLICATIONS

U.S. Appl. No. 16/232,973, "Notice of Allowance", dated Aug. 15, 2019, 8 pages.

EP18880056.9, "Extended European Search Report", dated Jan. 2, 2020, 7 pages.

EP18880056.9, "Office Action", dated Oct. 27, 2020, 5 pages.

PCT/US2018/067934, "International Preliminary Report on Patentability", dated Jul. 8, 2021, 8 pages.

PCT/US2018/067934, "International Search Report and Written Opinion", dated Nov. 7, 2019, 10 pages.

PCT/US2018/067937, "International Preliminary Report on Patentability", dated Jul. 8, 2021, 7 pages.

PCT/US2018/067937, "International Search Report and Written Opinion", dated Apr. 16, 2019, 10 pages.

PCT/US2018/068065, "International Preliminary Report on Patentability", dated Jul. 8, 2021, 7 pages.

PCT/US2018/068065, "International Search Report and Written Opinion", dated Apr. 2, 2019, 9 pages.

Texas Instruments, "ADS7042 Ultra-Low Power, Ultra-Small Size, 12-Bit, 1-MSPS, SAR ADC", Texas Instruments, Dallas, Texas, Jun. 2014, 45 pages.

RP Photonics Consulting AG, "Avalanche Photodiodes", RP Photonics Encyclopedia, 2016, 7 pages.

ACAM Mess Electronic, "TDC-GPX Ultra-High Performance 8 Channel Time-to-Digital Converter Datasheet", ACAM—Solutions in Time, Jan. 18, 2007, 53 pages.

Non-Final Office Action for U.S. Appl. No. 16/232,977, dated Mar. 1, 2022, 19 pages.

Notice of Decision to Grant for Application No. EP18880056.9, dated Oct. 14, 2021, 3 pages.

Notice of Allowance for U.S. Appl. No. 16/232,977, dated Jun. 24, 2022, 8 pages.

* cited by examiner

SYSTEM AND METHODS FOR RANGING OPERATIONS USING MULTIPLE SIGNALS

CROSS-REFERENCES TO RELATED APPLICATIONS

The following three U.S. patent applications listed below (which includes the present application) are being filed concurrently, and the entire disclosures of the other applications are incorporated by reference into this application for all purposes:

Application No. 16/232,973, filed Dec. 21, 2018, entitled "MULTI-PULSE FUSION ANALYSIS FOR LIDAR RANGING";

Application No. 16/232,977, filed Dec. 21, 2018, entitled "THREE-DIMENSIONAL LIGHT DETECTION AND RANGING SYSTEM USING HYBRID TDC AND ADC RECEIVER"; and Application No. 16/232/979, filed Dec. 21, 2018, entitled "MULTI-PULSE TECHNIQUE FOR IMPROVED DYNAMIC RANGE FOR INTENSITY INFORMATION IN LIDAR SYSTEMS.

BACKGROUND

Ranging operation generally refers to determining a distance between an observer and an object. Ranging operation can be found in many applications, such as in a collision avoidance system of a vehicle, among many others.

Ranging operation can be performed using various techniques including, for example, measuring time-of-flight of signals propagating between the observer and the object. Specifically, a transmitter of the observer can transmit a light signal at a first time. The signal can reach and reflected off the object, and the reflected light signal can be detected by a receiver of the observer at a second time. The difference between the first time and the second time can represent a total time-of-flight of the signal. Based on the speed of propagation of the signal, as well as the time-of-flight of the signal, the distance between the observer and the object can be determined. Moreover, based on a ratio of the amplitudes/powers of the transmitted and the reflected light signals, the reflectivity of the object can be measured, which can be part of the ranging operation or another standalone operation (e.g., to identify the object).

To improve the noise immunity of the ranging operation and reflectivity measurement, the receiver may include pre-processing circuits, such as amplifier and analog-to-digital converter (ADC), to perform pre-processing of the received signals. The receiver may also include processing circuits (e.g., digital signal processor) to perform processing on the pre-processed signals. The processing may include, for example, extracting amplitude characteristics (e.g., a shape), frequency content, etc., of the pre-processed signals to identify the reflected light signal. To perform the extraction, the pre-processed signal should to be linearly related to the received signal to preserve the amplitude characteristics and frequency contents.

A pre-processing circuit typically has a dynamic range for which the output is linearly related to the input. If the signal level of the reflected light signal is outside the dynamic range, the pre-processing circuits may introduce non-linearity to the output, such that the output is no longer linearly related to actual reflected light signal. Incorrect identification of the reflected light signal from the pre-processed signals may result, which can introduce errors to the ranging operation. In addition, errors can also be introduced to the measurement of the reflectivity of the target object.

BRIEF SUMMARY

In certain embodiments, an apparatus is provided. The apparatus is part of a Light Detection and Ranging (LiDAR) module of a vehicle and comprising a transmitter circuit, a receiver circuit having a dynamic range that defines a range of input for which an output of the receiver circuit is linearly related to the input, and a controller. The controller is configured to: configure a first signal level of a first signal and a second signal level of a second signal based on a range of distances to be measured by the LiDAR module, a range of reflectivity of a target object to be detected by the LiDAR module, and the dynamic range of the receiver circuit; and configure a time gap between the first signal and the second signal based on a minimum separation distance between two target objects to be resolved by the LiDAR module. The transmitter circuit is configured to transmit, respectively at a first time and a second time, the first signal having the first signal level and the second signal having the second signal level, the first time and the second time being separated by the time gap. The receiver circuit is configured to: detect signals comprising a reflected first signal and a reflected second signal generate based on reflection of respectively the first signal and the second signal by a target object; pre-process the detected signals, the pre-processing comprising at least one of amplifying or digitizing the detected signals; and output the pre-processed signals to the controller. The controller is further configured to: identify, from the pre-processed signals, candidate reflected signals, the identification being based on searching for a group of pre-processed signals that are separated by the time gap; compare the candidate reflected signals with the first signal and the second signal to identify at least one of the reflected first signal or the reflected second signal; and determine at least one of a distance between the apparatus and the target object or a reflectivity of the target object based on the at least one of the reflected first signal or the reflected second signal.

In some aspects, the controller is configured to: identify the reflected first signal from the candidate reflected signals; determine a first time difference between the first signal and the reflected first signal; determine a first time-of-flight of the first signal based on the first time difference; and determine the distance based on the first time-of-flight.

In some aspects, the controller is configured to: based on determining that the reflected second signal is not within the dynamic range of the receiver circuit, determining the distance based on the first time-of-flight.

In some aspects, the controller is configured to: based on determining that the reflected second signal is within the dynamic range of the receiver circuit, determining a second time-of-flight of the second signal based on a second time difference between the second signal and reflected second signal; and determining the distance based on the first time-of-flight and the second time-of-flight.

In some aspects, the controller is configured to: identify the reflected second signal from the candidate reflected signals; determine a second time difference between the second signal and the reflected second signal; determine a second time-of-flight of the second signal based on the second time difference; and determine the distance based on the second time-of-flight.

In some aspects, the controller is configured to: based on determining that the reflected first signal is not within the dynamic range of the receiver circuit, determining the distance based on the second time-of-flight.

In some aspects, the controller is configured to determine the reflectivity of the target object based on at least one of: a first ratio between the first signal level of the first signal and a third signal level of the reflected first signal, or a second ratio between the second signal level of the second signal and a fourth signal level of the reflected second signal.

In some aspects, the LiDAR module is a first LiDAR module. The time gap is a first time gap. The controller is configured to set the first time gap based on a second time gap between a third signal and a fourth signal transmitted by a second LiDAR module.

In some aspects, the controller is configured to transmit multiple groups of the first signal and the second signal. The time gap between the first signal and the second signal for each of the multiple groups is set based on a random function.

In some aspects, the first signal level is configured such that a signal level of the reflected first signal from a target object positioned at the minimum distance of the range of distances from the LiDAR module and having a maximum level of reflectivity of the range of levels of reflectivity, measured at an input of the receiver circuit, is equal to or below an upper end of the dynamic range. The second signal level is configured such that a signal level of the reflected second signal from a target object positioned at a maximum distance of the range of distances from the LiDAR module and having a minimum level of reflectivity of the range of levels of reflectivity, measured at the input of the receiver circuit, is equal to or above a lower end of the dynamic range.

In some aspects, a ratio between the first signal level and the second signal level is configured based on a ratio of signal of reflected signals generated by reflection of a signal at two target objects separated by a pre-determined distance, to enable the controller to determine whether two reflected signals are generated by reflection of a signal at two target objects or are generated by reflection of the first signal and the second signal at a single target object.

In certain embodiments, an apparatus is provided. The apparatus is part of a Light Detection and Ranging (LiDAR) module of a vehicle. The apparatus comprises a transmitter circuit configured to: transmit a first signal having a first signal level and a second signal having a second signal level, the second signal being transmitted after the first signal, the first signal and the second signal being separated by a time gap configured based on a minimum distance of a range of distances to be measured by the LiDAR module. The first signal level and the second signal level are configured based on the range of distances to be measured by the LiDAR module, a range of levels of reflectivity of a target object to be detected by the LiDAR module, and a dynamic range of a receiver circuit to receive the first signal and the second signal, such that at least one of a reflected first signal or a reflected second signal, generated based on reflection of respectively the first signal and the second signal by the target object, is within the dynamic range of the receiver circuit when received at the receiver circuit. The dynamic range defines a range of input for which an output of the receiver circuit is linearly related to the input.

In certain embodiments, an apparatus is provided. The apparatus is part of a Light Detection and Ranging (LiDAR) module of a vehicle. The apparatus comprises a receiver circuit that has a dynamic range that defines a range of input for which an output of the receiver circuit is linearly related to the input, and a controller. The receiver circuit is configured to: detect signals comprising a reflected first signal and a reflected second signal generated based on reflection of a first signal and a second signal by a target object, the first signal and the second signal being separated by a time gap configured based on a minimum distance of a range of distances to be measured by the LiDAR module, the first signal and the second signal having, respectively, a first signal level and a second signal level configured based on the range of distances to be measured by the LiDAR module, a range of levels of reflectivity of a target object to be detected by the LiDAR module, and the dynamic range of the receiver circuit; pre-process the detected signals, the pre-processing comprising at least one of amplifying or digitizing the detected signals; and output the pre-processed signals to the controller. The controller is configured to: identify, from the pre-processed signals, candidate reflected signals, the identification being based on searching for a group of pre-processed signals that are separated by the time gap; compare the candidate reflected signals with the first signal and the second signal to identify at least one of the reflected first signal and the reflected second signal; and determine at least one of a distance between the apparatus and the target object or a reflectivity of the object based on the at least one of the reflected first signal or the reflected second signal.

In certain embodiments, a method is provided. The method comprises: configuring, by a controller of a LiDAR module, a first signal level of a first signal and a second signal level of a second signal based on a range of distances to be measured by the LiDAR module, a range of reflectivity of a target object to be detected by the LiDAR module, and a dynamic range of a receiver circuit of the LiDAR module, wherein the dynamic range defines a range of input for which an output of the receiver circuit is linearly related to the input; configuring, by the controller, a time gap between the first signal and the second signal based on a minimum separation distance between two target objects to be resolved by the LiDAR module; transmitting, by a transmitter circuit of the LiDAR module and at respectively a first time and a second time, the first signal having the first signal level and the second signal having the second signal level, the first time and the second time being separated by the time gap; detecting, by the receiver circuit, signals comprising a reflected first signal and a reflected second signal generate based on reflection of respectively the first signal and the second signal by a target object; pre-processing, by the receiver circuit, the detected signals, the pre-processing comprising at least one of amplifying or digitizing the detected signals; outputting, by the receiver circuit, the pre-processed signals to the controller; identifying, by the controller and from the pre-processed signals, candidate reflected signals that are separated by the time gap; comparing, by the controller, the candidate reflected signals with the first signal and the second signal to identify at least one of the reflected first signal or the reflected second signal; and determining, by the controller, at least one of a distance between the LiDAR module and the target object or a reflectivity of the target object based on the at least one of the reflected first signal or the reflected second signal.

In some aspects, determining the distance comprises: identifying the reflected first signal from the candidate reflected signals; determining a first time difference between the first signal and the reflected first signal; determining a first time-of-flight of the first signal based on the first time difference; and determining the distance between the LiDAR module and the target object based on the first time-of-flight.

In some aspects, determining the distance comprises: based on determining that the reflected second signal is not within the dynamic range of the receiver, determining the distance based on the first time-of-flight.

In some aspects, determining the distance comprises: based on determining that the reflected second signal is within the dynamic range of the receiver, determining a second time-of-flight of the second signal based on a second time difference between the second signal and reflected second signal; and determining the distance based on the first time-of-flight and the second time-of-flight.

In some aspects, determining the reflectivity of the target object comprises: determining at least one of: a first ratio between the first signal level of the first signal and a third signal level of the reflected first signal, or a second ratio between the second signal level of the second signal and a fourth signal level of the reflected second signal; and determining the reflectivity based on at least one of the first ratio or the second ratio.

In some aspects, the method further comprises transmitting, by the transmitter circuit, multiple groups of the first signal and the second signal. The time gap between the first signal and the second signal for each of the multiple groups is set based on a random function.

In some aspects, the first signal level is configured such that a signal level of the reflected first signal from a target object positioned at the minimum distance of the range of distances from the LiDAR module and having a maximum level of reflectivity of the range of levels of reflectivity, measured at an input of the receiver circuit, is equal to or below an upper end of the dynamic range. The second signal level is configured such that a signal level of the reflected second signal from a target object positioned at a maximum distance of the range of distances from the LiDAR module and having a minimum level of reflectivity of the range of levels of reflectivity, measured at the input of the receiver circuit, is equal to or above a lower end of the dynamic range.

In some aspects, a ratio between the first signal level and the second signal level is configured based on a ratio of signal of reflected signals generated by reflection of a signal at two target objects separated by a pre-determined distance, to enable the controller to determine whether two reflected signals are generated by reflection of a signal at two target objects or are generated by reflection of the first signal and the second signal at a single target object.

BRIEF DESCRIPTION OF THE DRAWINGS

The detailed description is set forth with reference to the accompanying figures.

DETAILED DESCRIPTION

Figure 1:
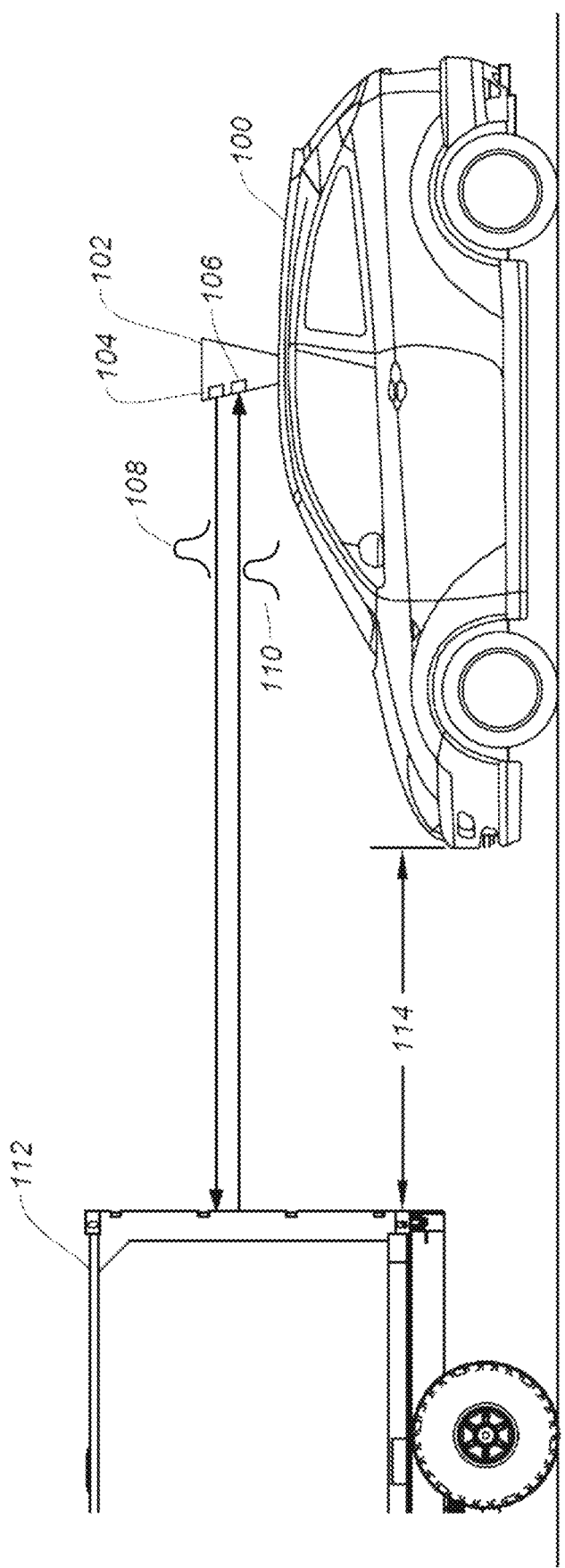
FIG. 1 shows an autonomous driving vehicle utilizing aspects of certain embodiments of the disclosed techniques herein.

In the following description, various examples of a ranging system will be described.

For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

A ranging system, such as a Light Detection and Ranging (LiDAR) module, typically includes pre-processing circuits to pre-process signals detected by a receiver. The pre-processing, which can include amplification and digitalization, can prepare the signals for subsequent processing operations to match a reflected signal with a previously-transmitted signal to determine the time-of-flight of the signal. The pre-processing circuits, such as amplifier and ADC, typically have a dynamic range for which the output is linearly related to the input. The lower end of the dynamic range can be related to, for example, the noise floor of the pre-processing circuits. If the input signal level is below the lower end of the dynamic range, the pre-processing circuits may be unable to distinguish the input from noise. The upper end of the input range can be related to, for example, a signal level which causes the amplifier and the ADC to saturate. If the input signal level is above the upper end of the dynamic range, the output of the pre-processing circuits may stay at the saturation level and no longer correlates with the input. In both cases, the pre-processing circuits may introduce non-linearity to the output, such that the output is no longer linearly related to actual reflected light signal. Non-linearity will corrupt the amplitude of the pre-processed reflected light signal and corrupt amplitude measurements, which can introduce error to the object reflectivity measurements. The distortion of pre-processed reflected light signal can also introduce error to the ranging operation.

To ensure that the pre-processing circuits output is linearly related to the input for proper processing operation, the signal level of the transmitted signal can be configured such that the reflected light signal, as received at the receiver, falls within the dynamic range. But it is difficult to pick one signal level to ensure that the reflected light signal level is within the dynamic range for various operation conditions, such as different measurement distances, different levels of reflectivity, etc. Specifically, for different measurement distances, the reflected light signal will experience different attenuations. A reflected light signal from an object near the receiver and/or with high reflectivity may saturate the receiver, while another reflected light signal from another object far away from the receiver and/or with low reflectivity may be indistinguishable from noise, even if the same signal is transmitted to both objects. In order to pick one transmitted signal level to ensure that the reflected light signal level stays within the dynamic range, the range of measurement distances and levels of reflectivity for the ranging operation may become very narrow, which can severely reduce the utility of the ranging operation.

Conceptual Overview of Certain Embodiments

Figure 3A:
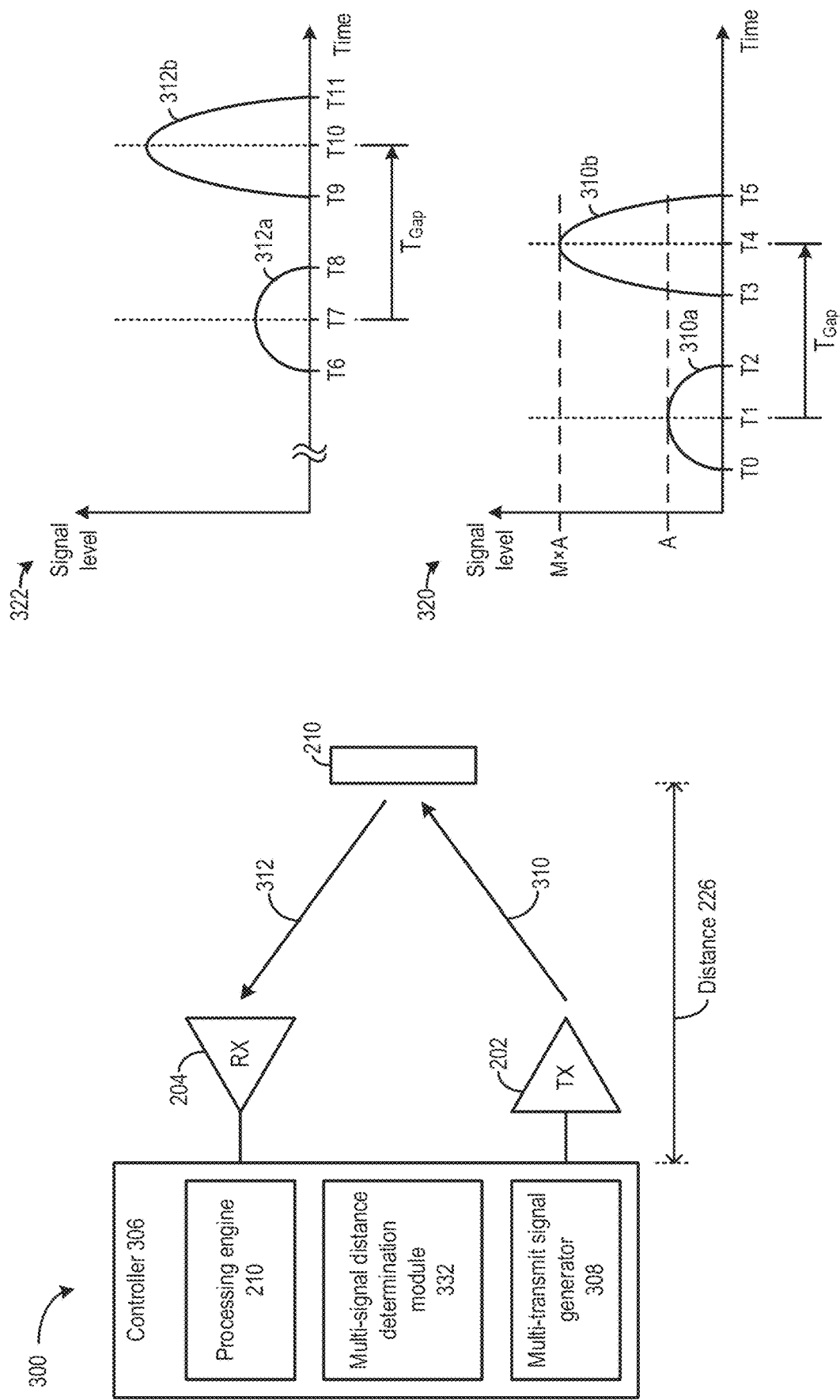
FIG. 3A and FIG. 3B illustrate an example of a ranging system, according to embodiments of the present disclosure.

Examples of the present disclosure relate to a ranging system, such as a LiDAR module, that can address the problems described above. Various embodiments of the ranging system can include a transmitter circuit, a receiver circuit, a controller, and a processing engine. The controller can control the transmitter circuit to transmit a first signal having a first signal level and a second signal having a second signal level towards a target object, with the second signal transmitted after the first signal. The first signal and the second signal can be separated by a pre-configured time gap. Examples of the first signal and the second signal are shown in FIG. 3A. The receiver circuit has a dynamic range and is configured to detect signals and perform certain pre-processing operation (e.g., amplification, digitization, etc.) on the detected signals. From the pre-processed signals, the controller can identify candidate reflected signals based on searching for a group of detected signals that are separated by the pre-configured time gap. The controller can then compare the candidate reflected signals with the first signal and the second signal to identify reflected first signal and reflected second signal. The comparisons can be in the amplitude and/or frequency domain. The controller can determine a distance between the ranging system and the target object based on at least one of the reflected first signal or the reflected second signal. For example, if the reflected first signal level is below the lower end of the dynamic range, the controller may measure the distance based on a time difference between the second signal and the reflected second signal. If the reflected second signal level is above the upper end of the dynamic range, the controller may measure the distance based on a time difference between the first signal and the reflected first signal.

The time gap between the first signal and the second signal can be configured to enable the ranging system to distinguish reflected light signals from multiple target objects. For example, as described in FIG. 4A, the time gap between the first signal and the second signal can be configured based on a minimum separation distance between two target objects to be resolved by the ranging system. The time gap can be configured as a minimum time-of-flight of the first signal between the two target objects, to prevent a reflected first signal, from a first target object further away from the ranging system, and a reflected second signal, from a second target object closer to the ranging system, from arriving at the receiver at the same time and interfering/corrupting each other.

In some embodiments, the time gap between the first signal and the second signal can be dynamically updated based on an operation condition. For example, as described in FIG. 4B, the ranging system may randomize the time gap between the first signal and the second signal as the vehicle approaches an object, to reduce the risk of return signals from the object for signals transmitted at different distances from the object interfering with each other. As another example, as described in FIG. 4C, when two vehicles are at vicinity of each other, the ranging system of each vehicle can insert a time gap between the first signal and the second signal configured for that vehicle. A ranging system can then identify the reflected light signals for a vehicle based on the time gap and only use the identified reflected light signals for ranging operation, while ignoring other reflected light signals separated by a different time gap configured for a different vehicle.

In addition, the first signal level (of the first signal) and the second signal level (of the second signal) can be configured to ensure that at least one of the reflected first signal or the reflected light signal is within a dynamic range of the receiver. For example, the first signal level may be smaller than the second signal level. The first signal level can be configured such that the reflected first signal received at the receiver from a target object positioned at a maximum measurement distance and having a minimum reflectivity has a signal level above the lower end of the dynamic range. Moreover, the second signal level can be configured such that reflected second signal received at the receiver from a target object positioned at a minimum measurement distance and having a maximum reflectivity has a signal level below the upper end of the dynamic range. With such arrangements, it can be ensured that at least one of the reflected first signal or the reflected light signal is within the dynamic range of the receiver across the reflectivity range and measurement distances range the ranging system operates in.

Moreover, in some embodiments, the first signal level and the second signal level can also be configured to enable the ranging system to distinguish reflected light signals from multiple target objects. For example, a first ratio of signal levels between reflected light signals from reflection of the first signal or the second signal at two target objects separated by a pre-determined separation distance can be determined. A second ratio between the first signal level and the second signal level can be configured based on the first ratio. The ranging system can then determine whether multiple reflected signals are generated by the reflection of a light signal at multiple target objects or are generated by the reflection of the first light signal and the second light signal at the same target object, based on whether the ratio of signal level between the reflected signals exceeds the first ratio.

With the disclosed embodiments, two (or more) signals are transmitted to measure the distance of one or more objects. The signal levels of the transmitted signals can be individually configured for the upper end and lower end of the dynamic range, and for the operation conditions associated with the upper end and lower end of the dynamic range (e.g., minimum measurement distance and maximum reflectivity, maximum measurement distance and minimum reflectivity, etc.). With such arrangements, it can be ensured that the signal level of at least one of reflected light signals is within the dynamic range and can be identified for time-of-flight measurement, even if the other reflected light signals are outside the dynamic range. This allows the ranging operating to be performed over a wider range of measurement distances and levels of reflectivity. Moreover, by configuring the time gap between the signals based on the minimum separation distance between target objects and based on the minimum measurement distance, interference between signals reflected from different target objects can be reduced. Different sets of reflected light signals from different target objects can also be identified more easily. As a result, the measurement of distances based on reflected light signals from multiple objects can become more accurate. All of these can improve the robustness and performance of a ranging system over conventional implementations.

Typical System Environment for Certain Embodiments

FIG. 1 illustrates an autonomous vehicle 100 in which the disclosed techniques can be implemented. Autonomous vehicle 100 includes a ranging system, such as LiDAR module 102. LiDAR module 102 allows autonomous vehicle 100 to perform object detection and ranging in a surrounding environment. Based on the result of object detection and ranging, autonomous vehicle 100 can maneuver to avoid a collision with the object. LiDAR module 102 can include a light steering transmitter 104 and a receiver 106. Light steering transmitter 104 can project one or more light signals 108 at various directions at different times in any suitable scanning pattern, while receiver 106 can monitor for a light signal 110 which is generated by the reflection of light signal 108 by an object. Light signals 108 and 110 may include, for example, a light pulse, a frequency modulated continuous wave (FMCW) signal, an amplitude modulated continuous wave (AMCW) signal, etc. LiDAR module 102 can detect the object based on the reception of light pulse 110, and can perform a ranging determination (e.g., measuring a distance of the object) based on a time difference between light signals 108 and 110. For example, as shown in FIG. 1, LiDAR module 102 can transmit light signal 108 at a direction directly in front of autonomous vehicle 100 at time T1 and receive light signal 110 reflected by an object 112 (e.g., another vehicle) at time T2. Based on the reception of light signal 110, LiDAR module 102 can determine that object 112 is directly in front of autonomous vehicle 100. Moreover, based on the time difference between T1 and T2, LiDAR module 102 can also determine a distance 114 between autonomous vehicle 100 and object 112. Autonomous vehicle 100 can adjust its speed (e.g., slowing or stopping) to avoid collision with object 112 based on the detection and ranging of object 112 by LiDAR module 102.

Figure 2A:
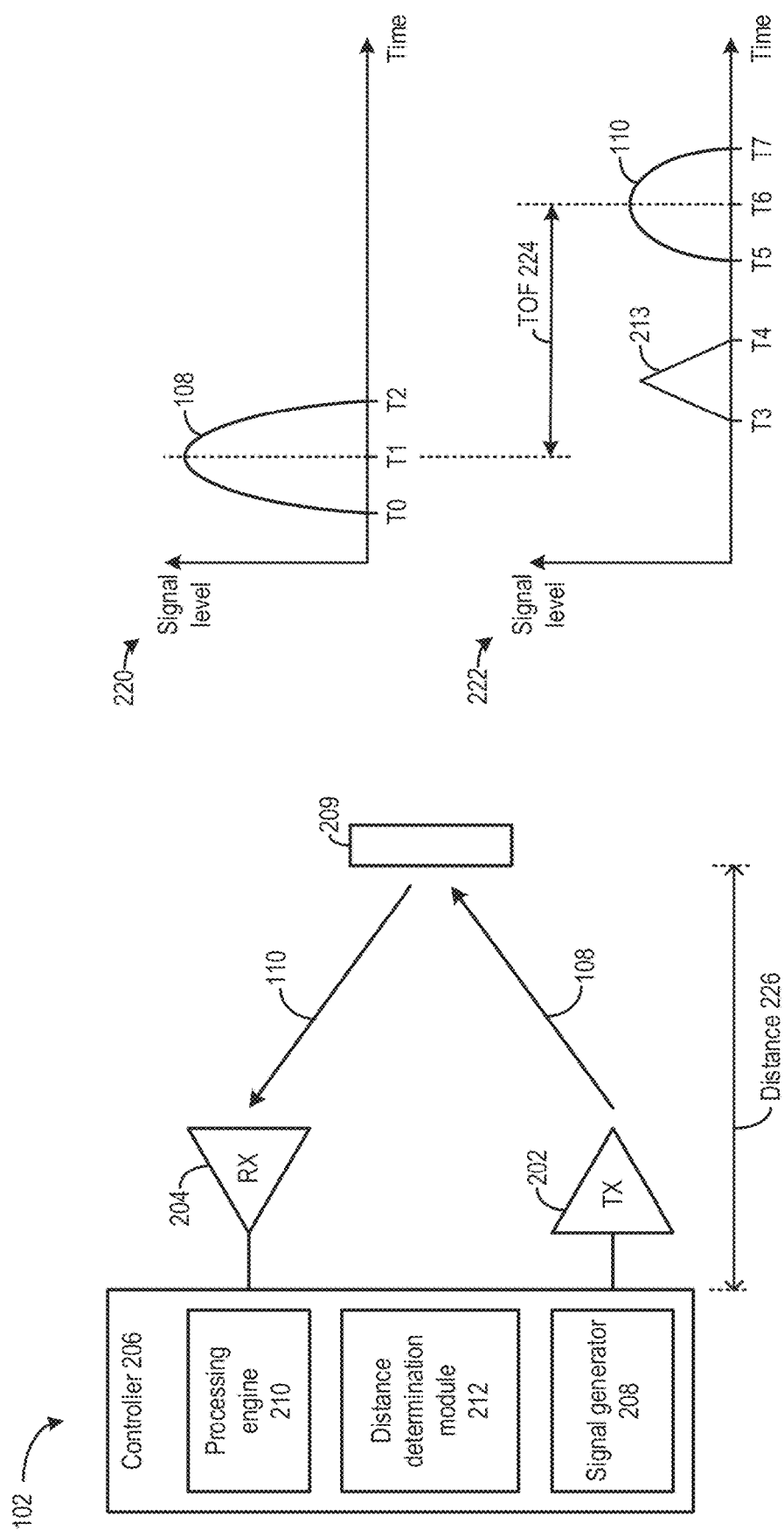
FIG. 2A and FIG. 2B illustrate examples of a ranging system that can be part of FIG. 1.

FIG. 2A illustrates examples of components of a LiDAR module 102. LiDAR module 102 includes a transmitter 202, a receiver 204, and a controller 206. Transmitter 202 may include a light source (e.g., a pulsed laser diode, a source of FMCW signal, a source of AMCW signal, etc.) to transmit light signal 108. Controller 206 includes a signal generator 208 which can determine the amplitude characteristics of light signal 108, as well as the time when transmitter 202 transmits light signal 108. Light signal 108 can propagate to and reflected off target object 209 to form reflected light signal 110. Receiver 204 can detect the reflected light signal 110 together with other signals.

Graphs 220 and 222 illustrate examples of light signal 108 and reflected light signal 110. Referring to graph 220 of FIG. 2A, which shows the output of transmitter 202 with respect to time, signal generator 208 can control transmitter 202 to transmit light signal 108 between times T0 and T2, with light signal 108 peaking at time T1. Light signal 108 can be reflected off target object 209 to become reflected light signal 110. Referring to graph 222 of FIG. 2A, which shows the input signals at receiver 204 with respect to time, receiver 204 can detect the reflected light signal 110 together with other light signals (e.g., signal 213). Receiver 204 can include a photodetector (e.g., a photodiode) which can convert received photons into current to represent the received light signals. Receiver 204 can also include pre-processing circuits, such as amplifier and ADC, to perform pre-processing operations on the photodetector output signals, and provide the pre-processed signals to processing engine 210 to extract the reflected light signal 110. The pre-processing operations can be performed to facilitate the signal processing operations at processing engine 210 of controller 206. For example, the amplifier can amplify the detected signals, whereas the ADC can convert the amplified signals from analog format to digital format. Graph 222 illustrates the pre-processing output of receiver 204 with respect to time.

The pre-processing circuits of receiver 204, such as amplifier and ADC, typically have a dynamic range for which the output is linearly related to the input. The lower end of the dynamic range can be related to, for example, the noise floor of the pre-processing circuits. If the input signal level is below the lower end of the dynamic range, the pre-processing circuits may be unable to distinguish the input from noise. The upper end of the input range can be related to, for example, a signal level which causes the amplifier and the ADC to saturate. If the input signal level is above the upper end of the dynamic range, the output of the pre-processing circuits may stay at the saturation level and is no longer linearly related to the input.

Moreover, processing engine 210 may include a digital signal processor (DSP) to perform the signal processing operations on the received signals which have been pre-processed (e.g., amplified and converted into digital format). The signal processing operations may include, for example, determining a pattern of changes of the signal level with respect to time, such as an amplitude envelop shape or other amplitude characteristics, of the receive signals. As another example, the processing may include Fast Fourier Transform (FFT) to extract frequency contents of the pre-processed signals. To ensure that processing engine 210 extracts the amplitude characteristics and frequency contents of the actual reflected light signal 110, the pre-processing output of receiver 204 needs to be linearly related to the input. As such, the signal level of reflected light signal 110 at the input of receiver 204 needs to be within the dynamic range of the pre-processing circuits of receiver 204.

Controller 206 further includes a distance determination module 212. Distance determination module 212 can collect the amplitude characteristics and/or frequency contents information of transmitted light signal 108 and received signals from, respectively, signal generator 208 and processing engine 210, and perform a search for reflected light signal 110 in the received signals. The search can be based on, for example, identifying a signal having amplitude characteristics and/or frequency contents that are scaled copies of amplitude characteristics and/or frequency contents of transmitted light signal 108. Referring to graph 222, based on amplitude characteristics, distance determination module 212 may determine that the received signal 213 between times T3 and T4 is not reflected light signal 110 because it does not have the same amplitude envelop shape as transmitted light pulse 108. Distance determination module 212 may also identify the received signals between times T5 and T7 as reflected light signal 110 based on the received signals having the same amplitude envelop shape as transmitted light signal 108. Distance determination module 212 can determine a time difference between transmitted light signal 108 and reflected light signal 110 to represent time-of-flight (TOF) 224 of light signal 108 between LiDAR module 102 and target object 209. The time difference can be measured between, for example, time T1 when light signal 108 peaks and time T6 when reflected light signal 110 peaks. Based on time-of-flight 224 and speed of propagation of light signals, distance determination module 212 can determine a distance 226 between LiDAR module 102 and target object 209.

The signal level of reflected light signal 110 at receiver 204 may vary depending on the measurement distance as well as the reflectivity of the target object. The measurement distance can determine a degree of attenuation of the transmitted light signal 108 along the propagation path from transmitter 202 to target object 209, as well as a degree of attenuation of the reflected light signal 110 along the propagation path from target object 209 back to receiver 204, with shorter measurement distance leading to less attenuation and vice versa. Moreover, the reflectivity of the target object 209 can also determine a percentage of the signal power of light signal 108 reflected by the object as the reflected light signal 110, with a higher reflectivity leading to a larger percentage of reflected light signal power and vice versa. The following equation provides an example relationship between a peak photodetector current at receiver 204, which represents the reflected light signal level at the input of the receiver, and the measurement distance and the target object reflectivity:

$$I_{peak} \propto \frac{\text{Reflectivity}}{\text{Distance}^2} \times e^{-2\gamma \times Distance} \quad \text{(Equation 1)}$$

In Equation 1, the peak photodetector current $I_{peak}$ can be directly proportional to the reflectivity for a given measurement distance. Moreover, $I_{peak}$ is related to a reciprocal of square of the measurement distance as well as a negative exponential function of the measurement distance, which means $I_{peak}$ drops at a very high rate with respect to the measurement distance. Gamma ($\gamma$) can refer to the light absorption coefficient of the atmosphere.

The signal level of light signal 108 can be configured based on an operational range of measurement distances and an operational range of object reflectivity to ensure that signal level of the signal level of the reflected light signal 110 at receiver 204 is within the dynamic range. For example, referring to FIG. 2B, when transmitter 202 transmits light signal 108 to a target object 230 at a minimum measurement distance $D_{MIN}$ (of the operational range of measurement distances) and having a maximum reflectivity $\rho_{max}$ (of the operational range of object reflectivity), the signal level of reflected light signal 110 received at receiver 204 will be at maximum. Light signal 108 can be configured, based on Equation 1, such that the maximum signal level of reflected light signal 110 is equal to or below the upper limit 252 of the dynamic range of receiver 204, as shown in graph 240. Moreover, when transmitter 202 transmits light signal 108 to a target object 250 at a maximum measurement distance $D_{MAX}$ and having a minimum reflectivity $\rho_{min}$, the signal level of reflected light signal 110 received at receiver 204 will be at minimum. Light signal 108 can be configured, based on Equation 1, such that the minimum signal level of reflected light signal 110 is equal to or above the lower limit 232 of the dynamic range of receiver 204, as shown in graph 240.

Figure 2B:
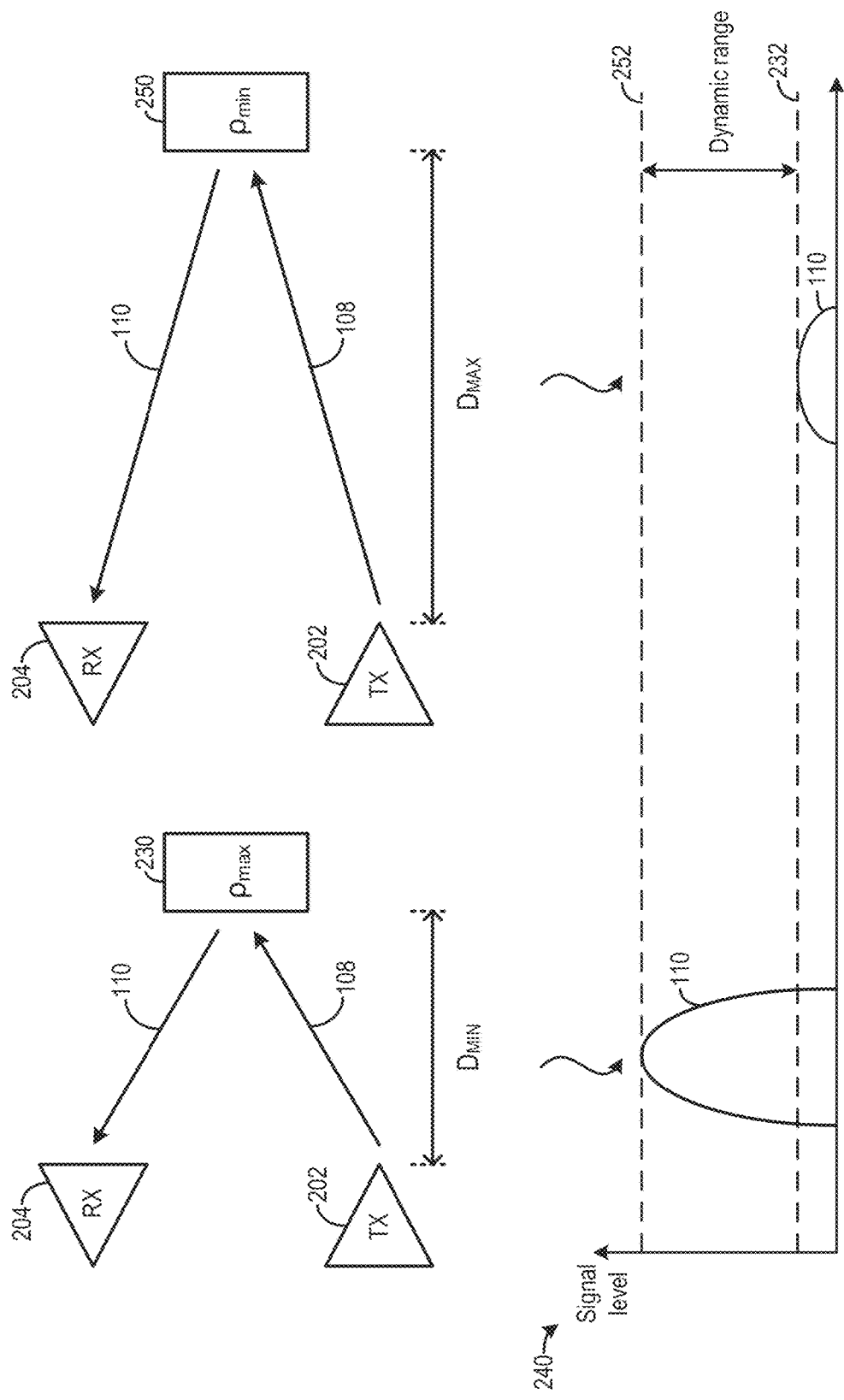

With the arrangements in FIG. 2B, the signal level of light pulse 108 can be configured to have the reflected light signal level within the dynamic range of receiver 204. However, the operational range of measurement distances $D_{MIN}$-$D_{MAX}$, as well as the operational range of reflectivity $\rho_{min}$-$\rho_{max}$, may become very narrow. LiDAR module 102 may be unable to perform ranging operations on an object that is closer than $D_{MIN}$ or further than $D_{MAX}$. LiDAR module 102 may also be unable to perform ranging operations on an object having a reflectivity below $\rho_{min}$ or above $\rho_{max}$. All these can pose severe limit on the performance and utility of LiDAR module 102.

Reference is now made to FIG. 3A, which illustrates another examples of a ranging system 300 that can be part of LiDAR module 102. As shown in FIG. 3A, ranging system 300 includes transmitter 202, receiver 204, and a controller 306. Controller 306 includes a multi-signal generator 308 which can control transmitter 202 to transmit multiple light signals 310, including light signal 310a and light signal 310b, to target object 209. Light signals 310a and 310b can be reflected off target object 209 to generate reflected light signals 312a and 312b, which can be detected and pre-processed by receiver 204. Although FIG. 3A illustrates that two light signals are transmitted, it is understood that multi-signal generator 308 can control transmitter 202 to transmit more than two light signals 310.

Graphs 320 and 322 illustrate examples of light signals 310a and 310b and reflected light signals 312a and 312b. Referring to graph 320, light signal 310a can be transmitted between times T0 and T2, while light signal 310b can be transmitted at a later time between times T3 and T5. Light signal 310a can have different signal level from light signal 310b. In the example shown in FIG. 3A, light signal 310a can have a signal level A, whereas light signal 310b can have signal level that is a multiple M of the signal level of light signal 310a (e.g., M×A). As to be discussed below, the signal levels of light signals 310a and 310b can be configured such that across an operational range of measurement distance and across an operational range of target object reflectivity, the reflected light signal level of at least one of light signals 310a or 310b can be within the dynamic range of receiver 204. In addition, corresponding points of light signals 310a and 310b are separated by a pre-configured time gap $T_{Gap}$. For example, the middle point of light signal 310a can be at time T1, whereas the middle point of light signal 310b can be at time T4, and times T1 and T4 can be separated by time gap $T_{Gap}$. Referring to graph 322, corresponding points of reflected light signals 312a and 312b from target object 209, received at receiver 204 between times T6 and T8 and between times T9 and T11, is also separated by the same time gap $T_{Gap}$. For example, the middle point of reflected light signal 312a can be at time T7, whereas the middle point of light signal 312b can be at time T10, and times T7 and T10 can also be separated by time gap $T_{Gap}$. As to be discussed below, $T_{Gap}$ can be configured to facilitate identification of reflected light signals (e.g., reflected light signals 312a and 312b) from a single target object in a case where receiver 204 receives multiple reflected light signals from multiple target objects, which can improve the accuracy of distance measurement.

Receiver 204 can receive reflected light signals 312a and 312b, together with other signals. Receiver 204 can perform pre-processing operations (e.g., amplification and digitalization) on the received signals, including reflected light signals 312a and 312b. Processing engine 210 of controller 306 can perform signal processing operations on the pre-processed signals including, for example, determining an amplitude envelop shape or other amplitude characteristics, extract frequency contents, etc.

Figure 3B:
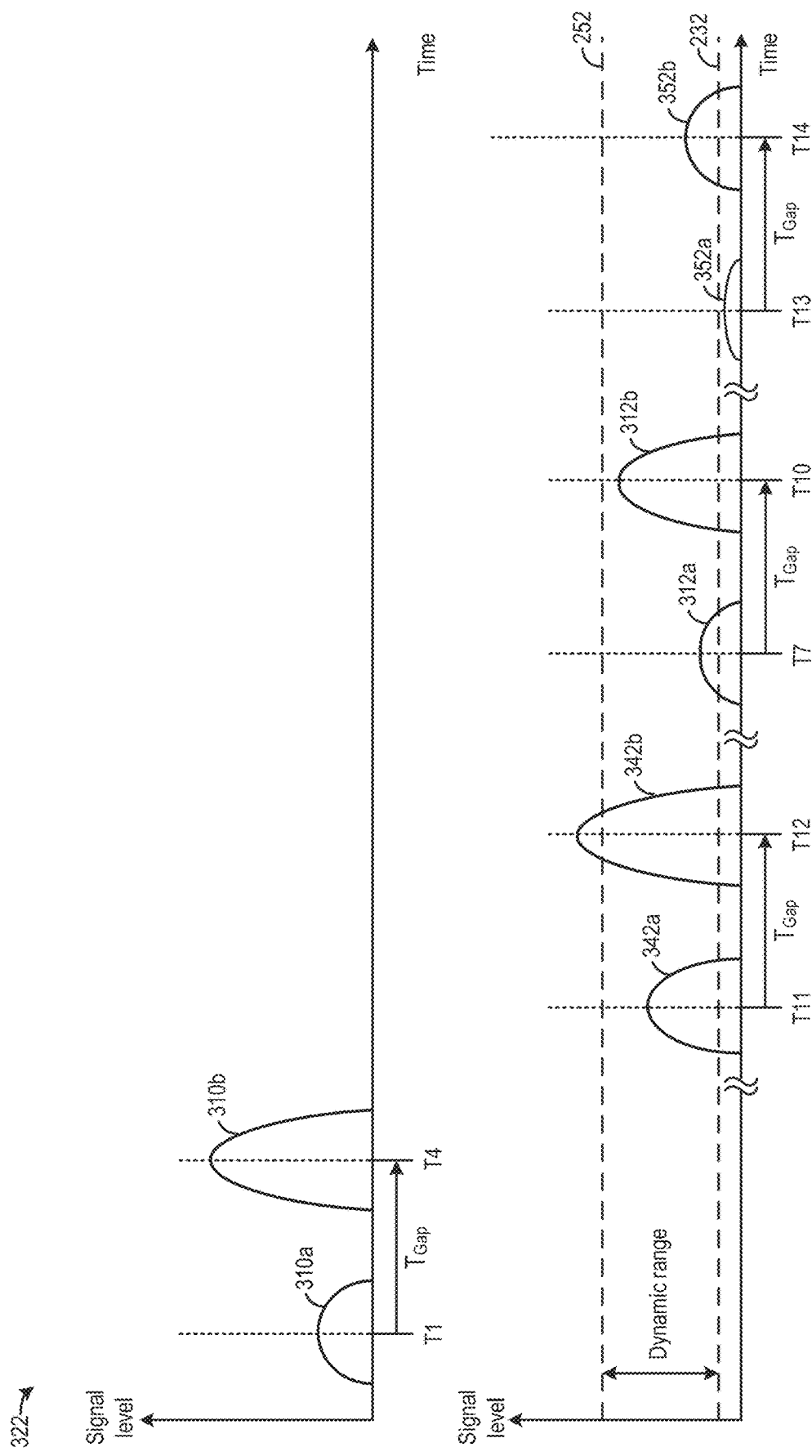

Multi-signal distance determination module 332 can measure distance 226 between ranging system 300 and target object 209 based on the processing results from processing engine 210. FIG. 3B includes a graph 340 that illustrates examples of distance measurement operations by multi-signal distance determination module 332 for target objects of different measurement distances and/or having different levels of reflectivity. Specifically, multi-signal distance determination module 332 can perform time-of-flight measurements in a multi-step process. In the first step, multi-signal distance determination module 332 identify one or more groups of candidate reflected signals. Each group of candidate reflected signals contain the same number of transmitted light signals (e.g., two as shown in FIG. 3A and FIG. 3B) and separated by time gap $T_{Gap}$. In the example shown in FIG. 3B, the groups of candidate reflected signals may include a group including reflected light signals 312a and 312b, a group including reflected light signals 342a and 342b, and a group including reflected light signals 352a and 352b. In each group, the corresponding points (e.g., middle points) of the signals are separated by time gap $T_{Gap}$. In the second step, multi-signal distance determination module 332 can match light signal 310a with a candidate reflected signal, and determine a time-of-flight of light signal 310a based on a time difference between light signal 310a and the matching candidate reflected signal. Multi-signal distance determination module 332 can also perform the same operation with light signal 310b. Multi-signal distance determination module 332 can then determine distance 226 based on the time-of-flight of at least one of light signals 310a or 310b.

Referring to FIG. 3B, as the first step, multi-signal distance determination module 332 can identify candidate reflected signals based on time gap $T_{Gap}$ even if the one of the reflected light signals within the group is outside the dynamic range of receiver 204, such that the pre-processed reflected light signal is distorted or otherwise not linearly related to the reflected light signal before the pre-processing. For example, reflected light signal 342b may exceed upper limit 252 of the dynamic range due to, for example, the target object being very close to ranging system 300 and/or having very high reflectivity. As a result the pre-processed reflected light signal 342b may be clipped. Also, reflected 352a may be below lower limit 232 of the dynamic range due to, for example, the target object being very far away from ranging system 300 and/or having very low reflectivity. As a result the pre-processed reflected light signal 352a may be distorted or otherwise not linearly related to reflected light signal 352a. For each detected signal, multi-signal distance determination module 332 can determine, for example, the timing of the middle point of the signal based on the variation of the signal level with respect to time, and then determine the time difference between the middle points of the detected signals to identify groups of reflected light signals. As shown in FIG. 3B, multi-signal distance determination module 332 can determine that the middle points of reflected light signals 312a and 312b, 342a and 342b, and 352a and 352b are at, respectively, time pairs T7 and T10, T11 and T12, and T13 and T14. Multi-signal distance determination module 332 may determine that each time pairs is separated by time gap $T_{Gap}$, and determine signals 312a and 312b, 342a and 342b, and 352a and 352b as the candidate reflected signals of light signals 310a and 310b.

After identifying groups of candidate reflected signals, multi-signal distance determination module 332 can determine, within each group, which candidate reflected signal is a reflected light signal of light signal 310a and which signal is a reflected light signal of light signal 310b. The determination can be based on comparing the amplitude characteristics and/or frequency contents of the candidate reflected signals with light signals 310a and 310b to determine which candidate reflected signal is linearly related to light signal 310a, and to determine which candidate reflected signal is linearly related to light signal 310b. Multi-signal distance determination module 332 can then determine the time difference between light signal 310a (or light signal 310b) and the matching candidate reflected signal as the time-of-flight of the light signal. Referring to FIG. 3B, multi-signal distance determination module 332 may determine that reflected light signal 342a is linearly related to light signal 310a, while the pre-processed output of reflected light signal 342b is saturated and not linearly related to light signal 310b. As a result, multi-signal distance determination module 332 can determine a time-of-flight of light signal 310a based on difference between T1 and T11, and use that time-of-flight to determine distance 226. Moreover, multi-signal distance determination module 332 may also determine that reflected light signal 352b is linearly related to light signal 310b, but the signal level of reflected light signal 352a is too low and the pre-processed output is not linearly related to light signal 310a. Therefore, multi-signal distance determination module 332 can determine a time-of-flight of light signal 310b based on difference between T4 and T14, and use that time-of-flight to determine distance 226. Further, multi-signal distance determination module 332 may determine that reflected light signals 312a and 312b are linearly related to, respectively, light signals 310a and 310b, and can determine the time-of-flights of both light signal 310a (based on the difference between T1 and T7) and of light signal 310b (based on the difference between T4 and T10). Multi-signal distance determination module 332 can determine distance 226 based on one of the time-of-flights of light signals 310a and 310b, or by averaging the time-of-flights of both signals. Such approach can improve the probability of detecting target object 209 and correctly measuring distance 226.

Figure 4A:
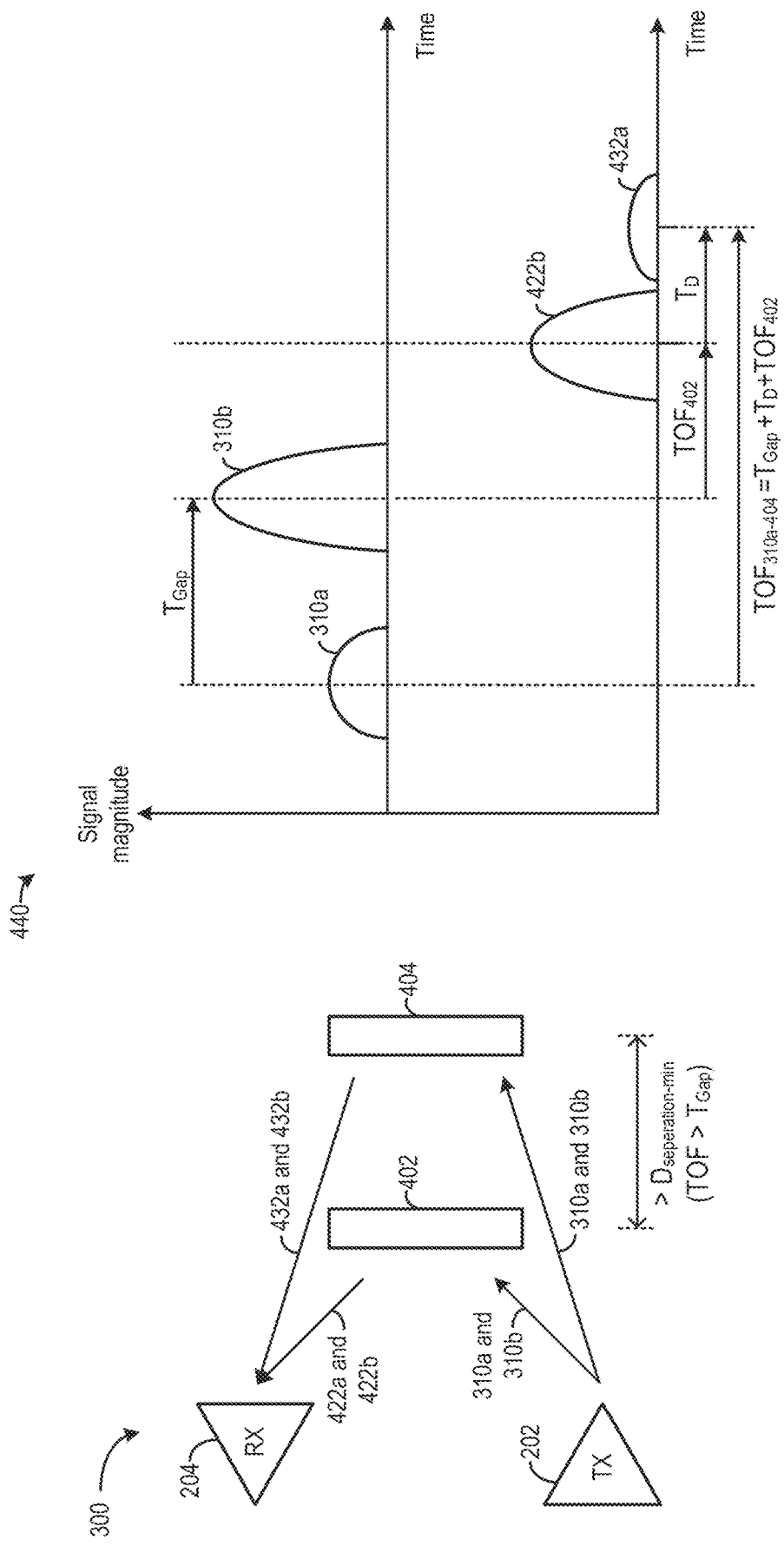
FIG. 4A-FIG. 4C illustrate examples of configuration of the ranging system of FIG. 3A and FIG. 3B, according to embodiments of the present disclosure.

As described above, the time gap $T_{Gap}$ between the light signal 310a and light signal 310b can be configured to facilitate identification of reflected light signals from a single target object in a case where receiver 204 receives multiple reflected light signals from multiple target objects. FIG. 4A illustrates an example configuration of time gap $T_{Gap}$. As shown in FIG. 4A, the time gap $T_{Gap}$ between light signal 310a and light signal 310b can be configured based on (or used to define) a minimum separation distance $D_{separation-min}$ between two target objects to be resolved by ranging system 300. As shown in graph 410, light signals 310a and 310b can reflect off a target object 402 to generate, respectively, reflected light signals 422a and 422b. Moreover, light signals 310a and 310b can also reflect off a target object 404 to generate, respectively, reflected light signals 432a and 432b. Referring to graph 440, if the separation distance between target objects 402 and 404 exceeds the minimum separation distance $D_{separation-min}$, the time-of-flight of light signal 310a between target objects 402 and 404 will exceed time gap $T_{Gap}$ by an additional delay $T_D$. The total time-of-flight of light signal 310a between ranging system 300 and target object 404 (denoted as $TOF_{310a-404}$ in FIG. 4A) can be given by the sum of $T_{Gap}$, $T_D$, and a time-of-flight between ranging system 300 and target object 402 (denoted as $TOF_{402}$ in FIG. 4A). Moreover, the time-of-flight of light signal 310b between ranging system 300 and target object 402 is $TOF_{402}$.

As shown in FIG. 4A, with the additional delay $T_D$, reflected light signal 422b (from reflection of light signal 310b by target object 402) and reflected light signal 432a (from reflection of light signal 310a by target object 404) can occupy different times, which can reduce interference between the two reflected light signals and allow multi-signal distance determination module 332 to distinguish between reflected light signal 422b and reflected light signal 432a reflected from different target objects. Such arrangements can reduce the risk of multi-signal distance determination module 332 ignoring reflected light signal 422b and reflected light signal 432a for time-of-flight determination due to the signals corrupting each other as they arrive at receiver 204 at the same time. Moreover, such arrangements can also reduce the likelihood of multi-signal distance determination module 332 erroneously measuring the distance of target object 404 based on reflected light signals 422b reflected by target object 402.

Time gap $T_{Gap}$ can be configured based on other criteria. For example, $T_{Gap}$ can be configured based on the time-of-flight of a light signal over the maximum measurement distance, if the time budget allows. In some examples, time gap $T_{Gap}$ can also be minimized, for example, to the extent that multi-signal distance determination module 332 can distinguish between two reflected light signals from the same object (e.g., between reflected light signals 422a and 422b, between reflected light signals 432a and 432b, etc.). In some examples, time gap $T_{Gap}$ can be configured based on other criteria (e.g., to enforce minimum measurement distance, to distinguish the reflected light signals for different vehicles/LiDAR systems, etc., as to be described below) and not to avoid interference between the reflected light signals from different objects (e.g., reflected light signals 422b and 432a). For example, if the amplitude difference between light signals 310a and 310b is large, the amplitude between reflected light signals 422b and 432a will also be large. In this case, even if reflected light signals 432a and 422b overlap, the corruption of the stronger reflected light signal (e.g., light signal 422a) by the weaker reflected light signal (e.g., light signal 432a) is relatively small, and the stronger reflected light signal can still be identified by multi-signal distance determination module 332. In such a case, or in other cases where interference between reflected signals from different objects is acceptable, time gap $T_{Gap}$ needs not be configured to avoid interference between the reflected light signals from different objects.

Figure 4B:
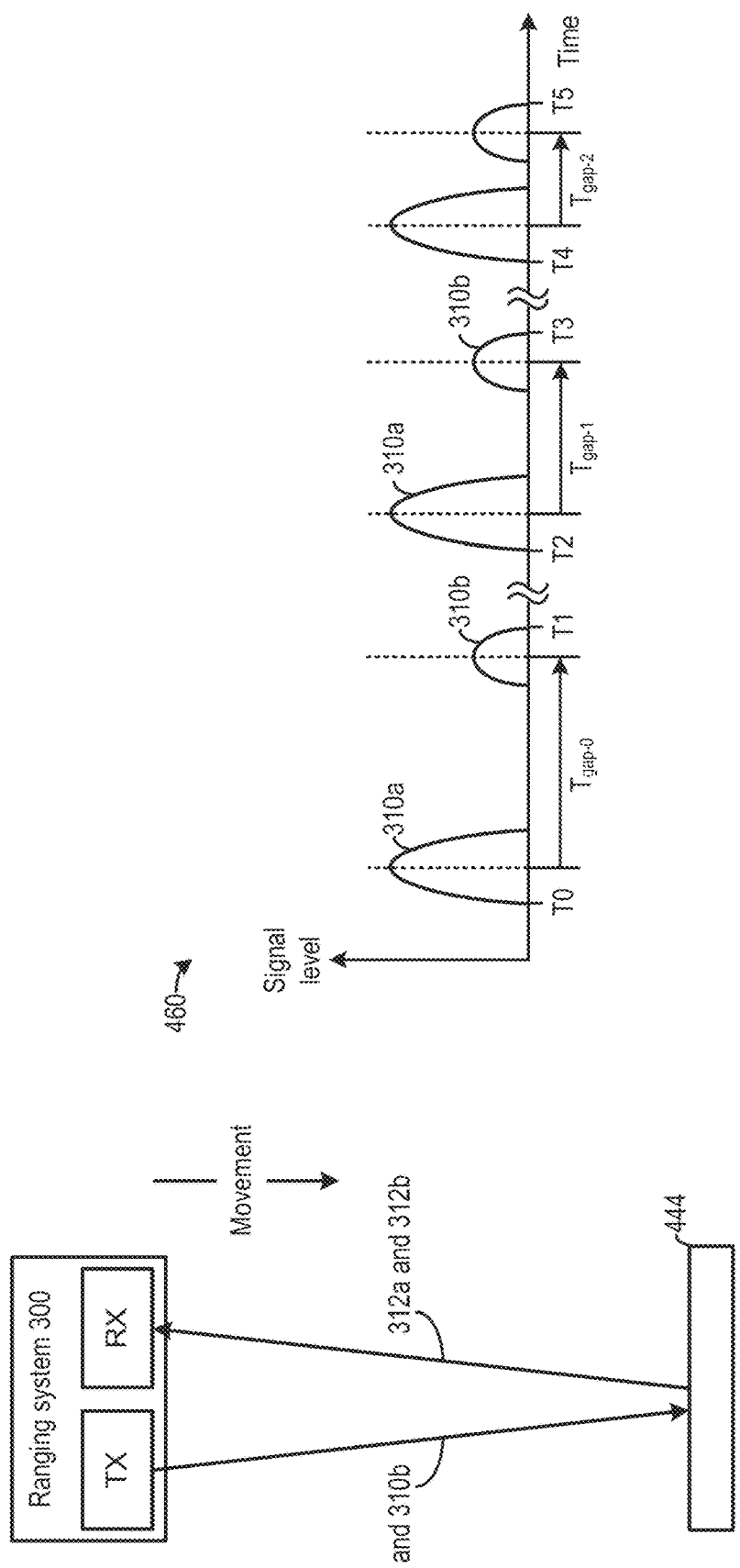
Figure 4C:
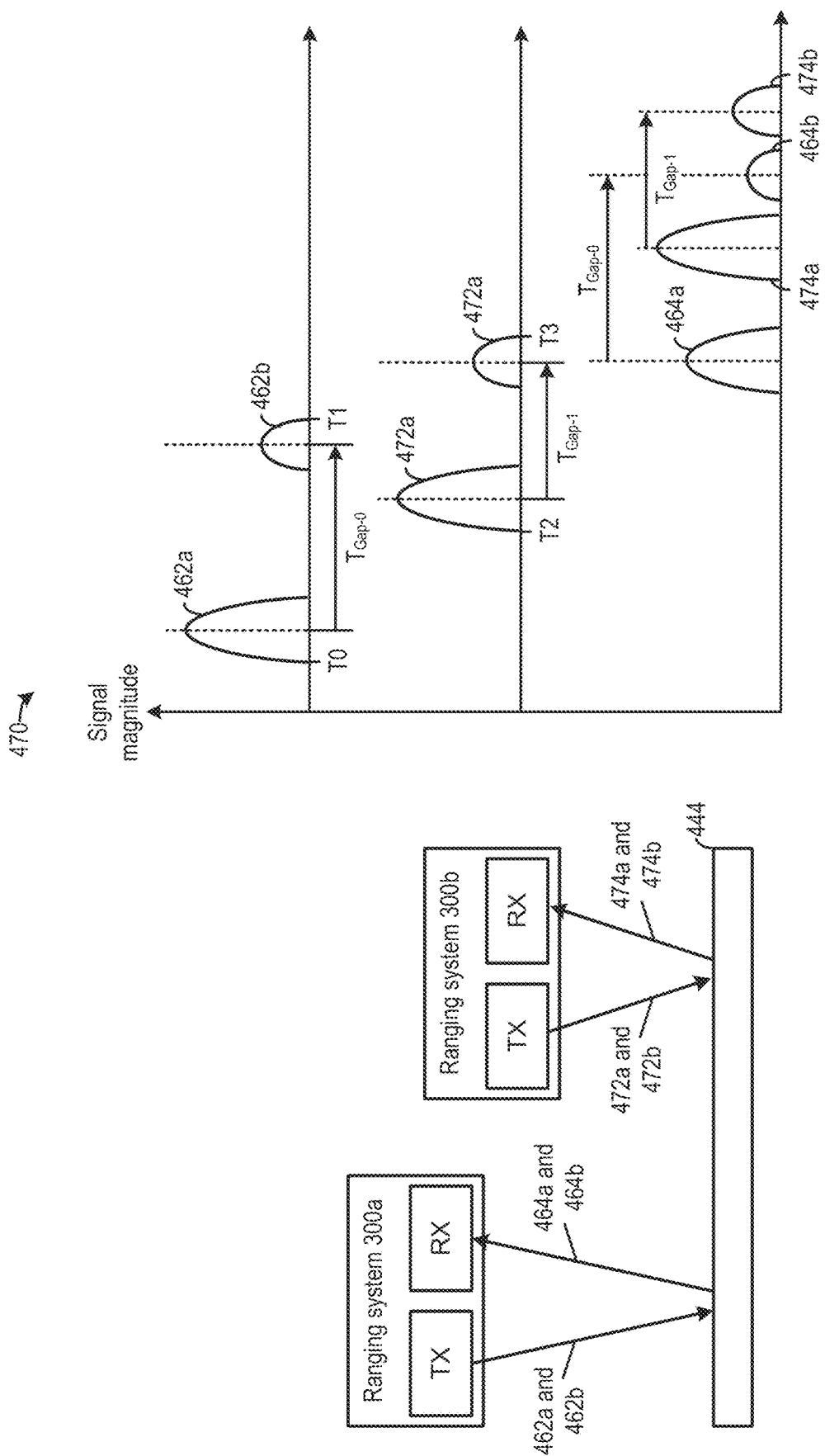

In some embodiments, the time gap $T_{Gap}$ between light signals 310a and 310b can be dynamically updated based on an operation condition. FIG. 4B and FIG. 4C illustrate examples of dynamic adjustment of time gap $T_{Gap}$. FIG. 4B illustrates an example where time gap $T_{Gap}$ can be dynamically adjusted to measure the distance of an approaching target object. Ranging system 300 can transmit multiple groups of light signals 310a and 310b. The $T_{Gap}$ between light signals 310a and 310b can be dynamically adjusted between each group so that each group can have different $T_{Gap}$. The adjustment can be based on, for example, a random function. Changing $T_{Gap}$ from one scan point to another can increase the likelihood that the multiple groups of reflected light signals 312a and 312b arrive at different times to avoid interference between the groups of reflected signals, which can avoid the loss of multiple points in a frame. For example, referring to FIG. 4B, a vehicle carrying ranging system 300 may move towards a target object 444. As shown in graph 460, between times T0 and T1, ranging system 300 may transmit light signals 310a and 310b of which the middle points are separated by time gap $T_{Gap-0}$. Between times T2 and T3 transmitter 202 can retransmit light signals 310a and 310b with a reduced time gap $T_{Gap-1}$ (compared with $T_{Gap-0}$), whereas between times T4 and T5 transmitter 202 can retransmit light signals 310a and 310b with a gap $T_{Gap-2}$ that is different from $T_{Gap-1}$ and $T_{Gap-0}$. As the distance between ranging system 300 and object 444 keeps shrinking, the light signals 310a and 310b transmitted between the earlier times T0 and T1 experiences a longer time-of-flight than and the light signals 310a and 310b transmitted between the later times T2 and T3. As a result, it is possible that their reflected light signals may arrive at vicinity to each other. By randomizing the time gap $T_{Gap}$ for different groups of light signals 310a and 310b, ranging system 300 can distinguish the closely-timed reflected signals for the different groups of light signals 310a and 310b based on the different values of time gap $T_{Gap}$ to perform distance and reflectivity determination. With such arrangements, the accuracy of distance and reflectivity determination can be improved.

FIG. 4C illustrates another example where time gap $T_{Gap}$ can be dynamically adjusted to associate transmitted signals with different vehicles, to avoid a vehicle using reflected light signals targeted at another vehicle for distance measurement. As shown in FIG. 4C, two ranging systems 300a and 300b of two different vehicles may transmit light signals to target object 444. Referring to graph 470, ranging system 300a may transmit light signals 462a and 462b between times T0 and T1, which are reflected off target object 444 to generate reflected light signals 464a and 464b. Moreover, ranging system 300b may transmit light signals 472a and 472b between times T2 and T3, which are reflected off target object 444 to generate reflected light signals 474a and 474b. If ranging systems 300a and 300b are at vicinity of each other, the receiver of each ranging system may receive reflected signals that are targeted at both ranging systems. For example, referring to graph 460, ranging system 300a may receive a mixture of reflected light signals 464a, 464b, 474a, and 474b, and need to identify the reflected light signals that are targeted at ranging system 300a (e.g., reflected signals 464a and 464b) for distance measurement, while ignoring reflected light signals that are not targeted at ranging system 300a (e.g., reflected signals 474a and 474b). Ranging system 300b may also need to identify reflected signals 474a and 474b for distance measurement.

To enable each ranging system to identify reflected light signals targeted at that ranging system, each ranging system can insert different time gaps $T_{Gap}$ between the transmitted light signals. The time gap can be configured to identify the reflected signals for a particular vehicle. In the example of FIG. 4C, ranging system 300a may insert time gap $T_{Gap-0}$ between light signals 462a and 462b, so that reflected light signals 464a and 464b are also separated by time gap $T_{Gap-0}$. Moreover, ranging system 300b may insert time gap $T_{Gap-1}$ between light signals 472a and 472b, so that reflected light signals 474a and 474b are also separated by time gap $T_{Gap-1}$. The multi-signal distance determination module 332 of each ranging system can then identify the reflected light signals targeted for each ranging system based on identifying the time gaps between the detected signals.

There are different ways of configuring a time gap value for a vehicle. In some embodiments, the time gap can be unique for a particular vehicle, and the ranging systems of different vehicles can be pre-configured to insert different time gaps. In some embodiments, the ranging system of a vehicle can insert a default time gap between transmitted light signals when no other vehicle is close by. When another vehicle is close by (e.g., being within certain a distance), the ranging system of the vehicle can discover the ranging system of the other vehicle. The ranging systems of the two vehicles can communicate to exchange time gap configuration information. The ranging systems can also negotiate with each other so that they can use different time gaps for light signal transmission. When the vehicles are no longer at vicinity to each other, the ranging system of the vehicle can revert back to inserting the default time gap between transmitted light signals.

In addition to time gap $T_{Gap}$, the signal levels of light signals 310a and 310b can be configured based on the operation conditions of ranging system 300. For example, as described above, the signal levels of light signals 310a and 310b can be configured to ensure that at least one of the reflected light signals 312a or 312b, at receiver 204, is within the dynamic range of the receiver across an operational range of measurement distance and across an operational range of target object reflectivity. The signal levels of light signals 310a and 310b can be individually configured for the upper end and lower end of the dynamic range, and for the operation conditions associated with the upper end and lower end of the dynamic range.

Figure 5A:
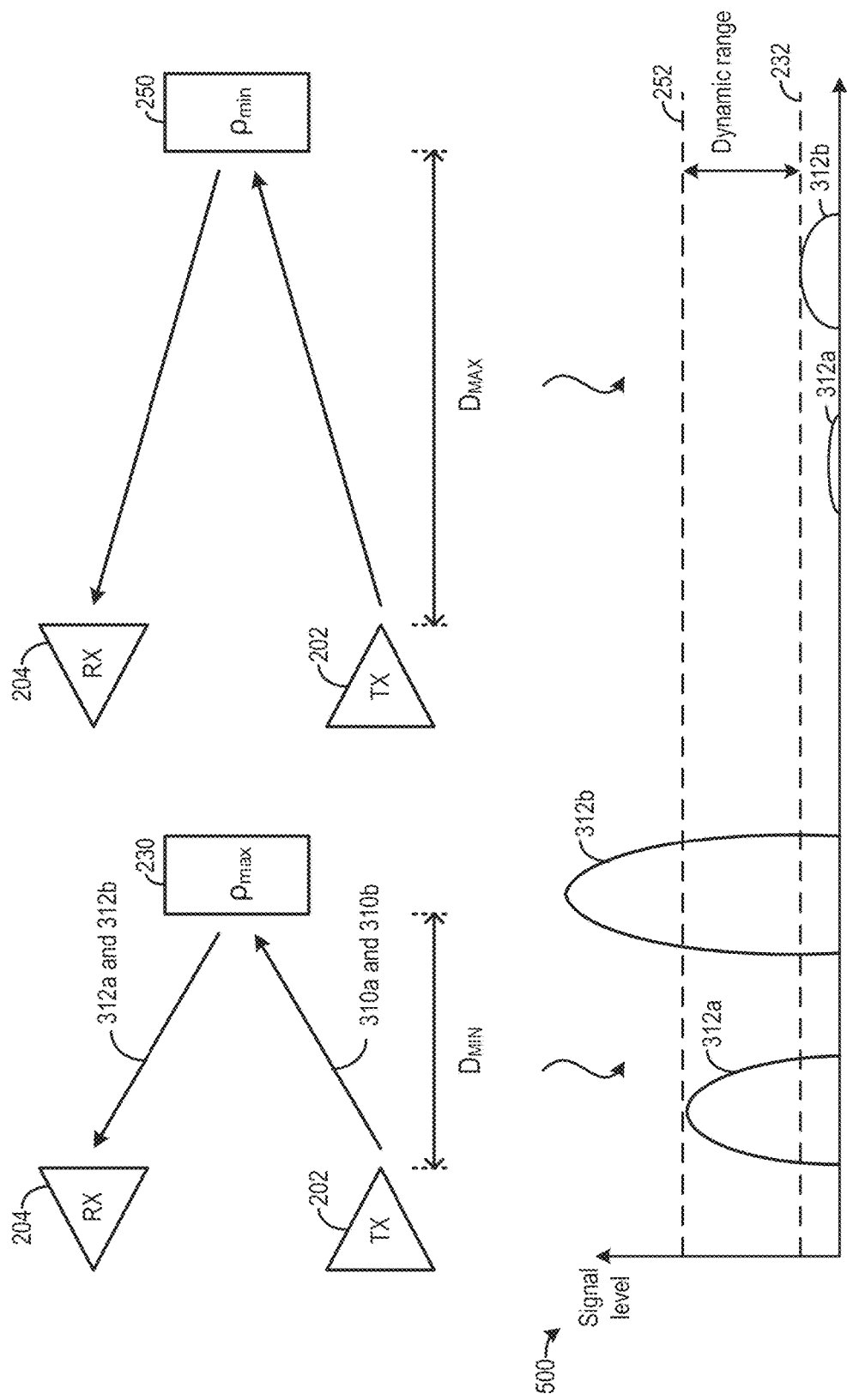
FIG. 5A-FIG. 5C illustrate another examples of configuration of the ranging system of FIG. 3A and FIG. 3B, according to embodiments of the present disclosure.

FIG. 5A illustrates an example of configuration of the signal levels of light signals 310a and 310b. As described above, the signal level of light signal 310a can be smaller than that of light signal 310b. As shown in FIG. 5A, light signal 310a can be configured such that the maximum signal level of reflected light signal 312a is at or below the upper limit 252 of the dynamic range, whereas light signal 310b can be configured such that minimum signal level of reflected light signal 312b is at or above the lower limit 232 of the dynamic range.

Specifically, the signal level of light signal 310a can be configured such that reflected signal 312a reflected from target object 230 having maximum reflectivity $\mu_{max}$ and positioned at a minimum measurement distance $D_{MIN}$ from ranging system 300 is at or below the upper limit of 252 of the dynamic range. In this scenario, although the signal level of reflected light signal 312b (from the reflection of light signal 310b) exceeds upper limit of 252, multi-signal distance determination module 332 can ignore reflected light signal 312b and perform time-of-flight determination using reflected light signal 312a, which is within the dynamic range of receiver 204 and the pre-processed signal is linearly related to the reflected light signal 312b received by receiver 204.

Moreover, the signal level of light signal 310b can be configured such that reflected signal 312b reflected from target object 250 having a minimum reflectivity $\rho_{min}$ and positioned at a maximum measurement distance $D_{max}$ from ranging system 300 is at or above the lower limit of 232 of the dynamic range. In this scenario, although the signal level of reflected light signal 312a (from the reflection of light signal 310b) is below lower limit of 232, multi-signal distance determination module 332 can ignore reflected light signal 312a and perform time-of-flight determination using reflected light signal 312b, which is within the dynamic range of receiver 204 and the pre-processed signal is linearly related to the reflected light signal 312b received by receiver 204.

Figure 5B:
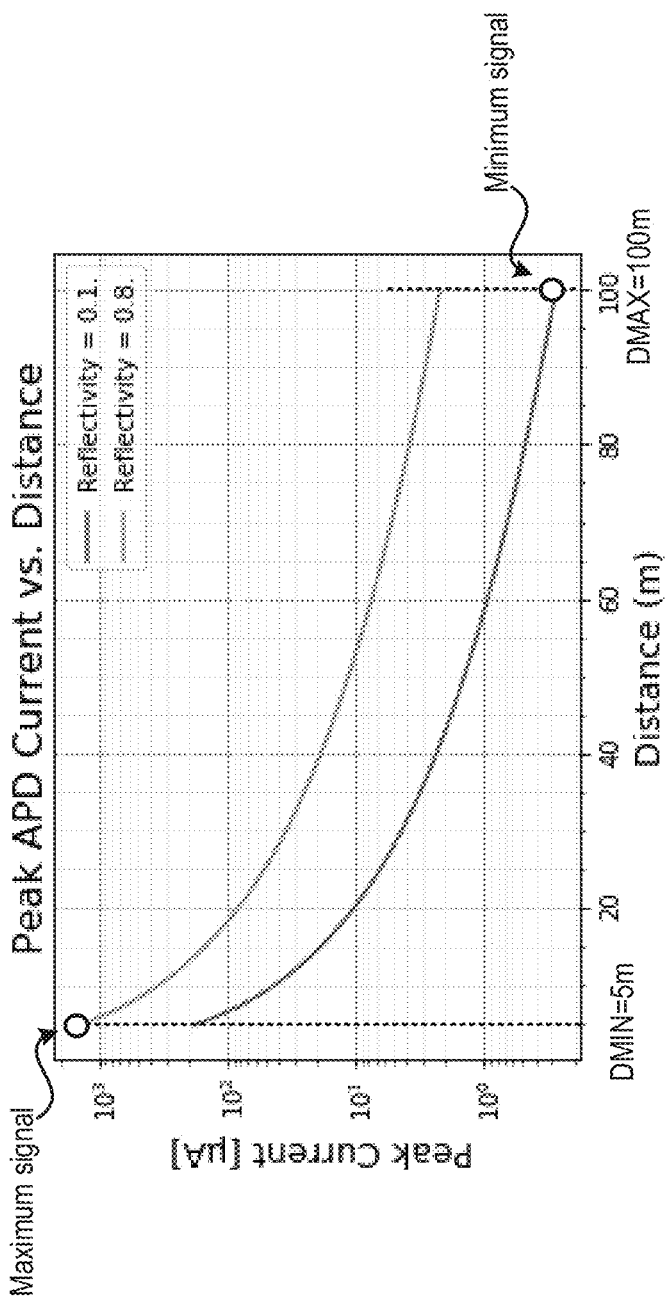

In some embodiments, the ratio between signal levels of light signals 310a and 310b (M in FIG. 3A) can also be configured by finding the signal dynamic range, which can be the ratio between the maximum received signal level (e.g., reflected signal 312b reflected from target object 230 having reflectivity $\rho_{MAX}$ and positioned at distance $D_{MIN}$) and the minimum received signal level (e.g., reflected signal 312a reflected from target object 250 having reflectivity $\rho_{min}$ and positioned at distance $D_{MAX}$, and dividing the ratio by the dynamic range of the ADC of receiver 204 (in terms of number of bits). For example, referring to FIG. 5B, assuming that the reflectivity of an object for the ranging operation is between 0.1 and 0.8, and the distance of the object is between $D_{MIN}$ (e.g., 5 meters) and $D_{MAX}$ (e.g., 100 meters). A signal dynamic range, which can be defined based on a ratio between maximum signal (e.g., maximum APD peak current) and preprocessing system noise (e.g., APD+Amplifier+ADC), can be about 20k. The dynamic range of ADC is 10 bits (which represents 1024 linear ratios). The value of M can be chosen to be greater than 20k/1024, such as 20. An optimum value of M can be chosen as the square root of the signal dynamic range (square root of 20k) which equals to 141.

Figure 5C:
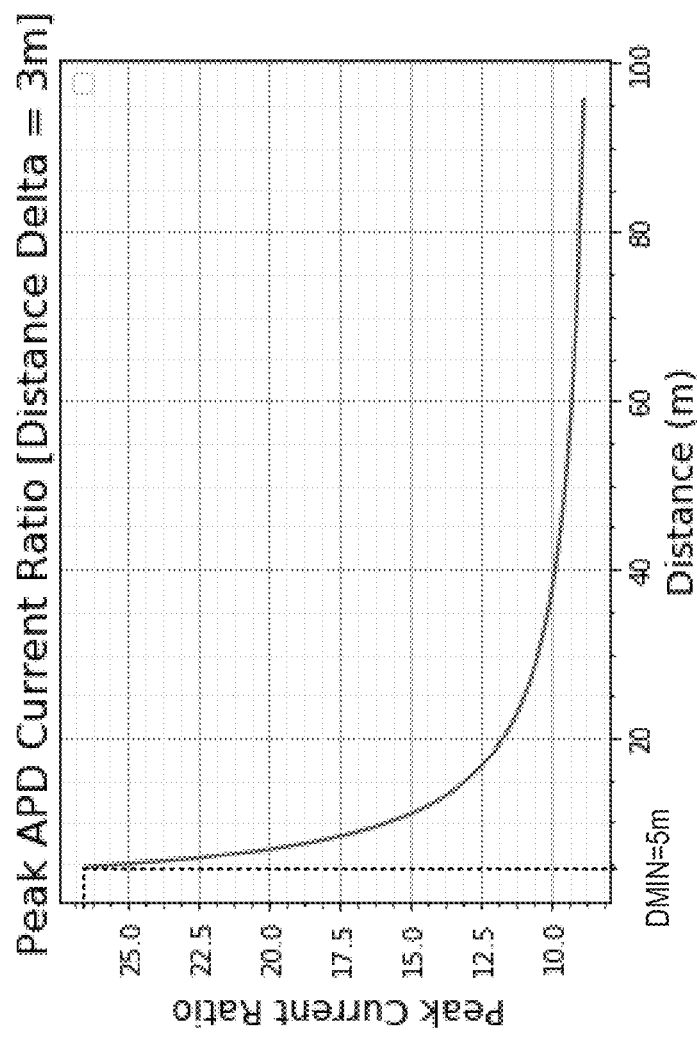

In some examples, the ratio between signal levels of light signals 310a and 310b (M) can also be configured to enable ranging system 300 to distinguish reflected light signals from multiple target objects. Reference is now made to FIG. 5C, which illustrates a relationship of peak photodetector current (APD current) ratio from reflected light signals reflected by two target objects that are 3 meters apart. The ratio is the maximum when the closest target object is at zero distance from ranging system 300, and the ratio decreases as the distance between the closest target object and ranging system 300 increases. Referring to FIG. 5C, if the minimum measurement distance $D_{MIN}$ is 5 meters, the ratio of peak photodetector current of reflected signals generated by reflection of the same light pulse by the target objects is about 29. For multi-signal distance determination module 332 to determine whether two reflected light signals correspond to reflected light signal 312a and reflected light signal 312b reflected from the same object, or correspond to one of light signal 312a or 312b reflected from the two target objects, the ratio of light signals 310a and 310b can be set above 29. With such arrangements, reflected signals within time interval $T_{Gap}$ having signal levels ratio below 29 can be determined to be generated by reflection of the same light signal by different target objects, whereas reflected signals having signal levels ratio above 29 can be determined as generated by the reflection of light signals 310a and 310b are from the same target object.

Method

Figure 6:
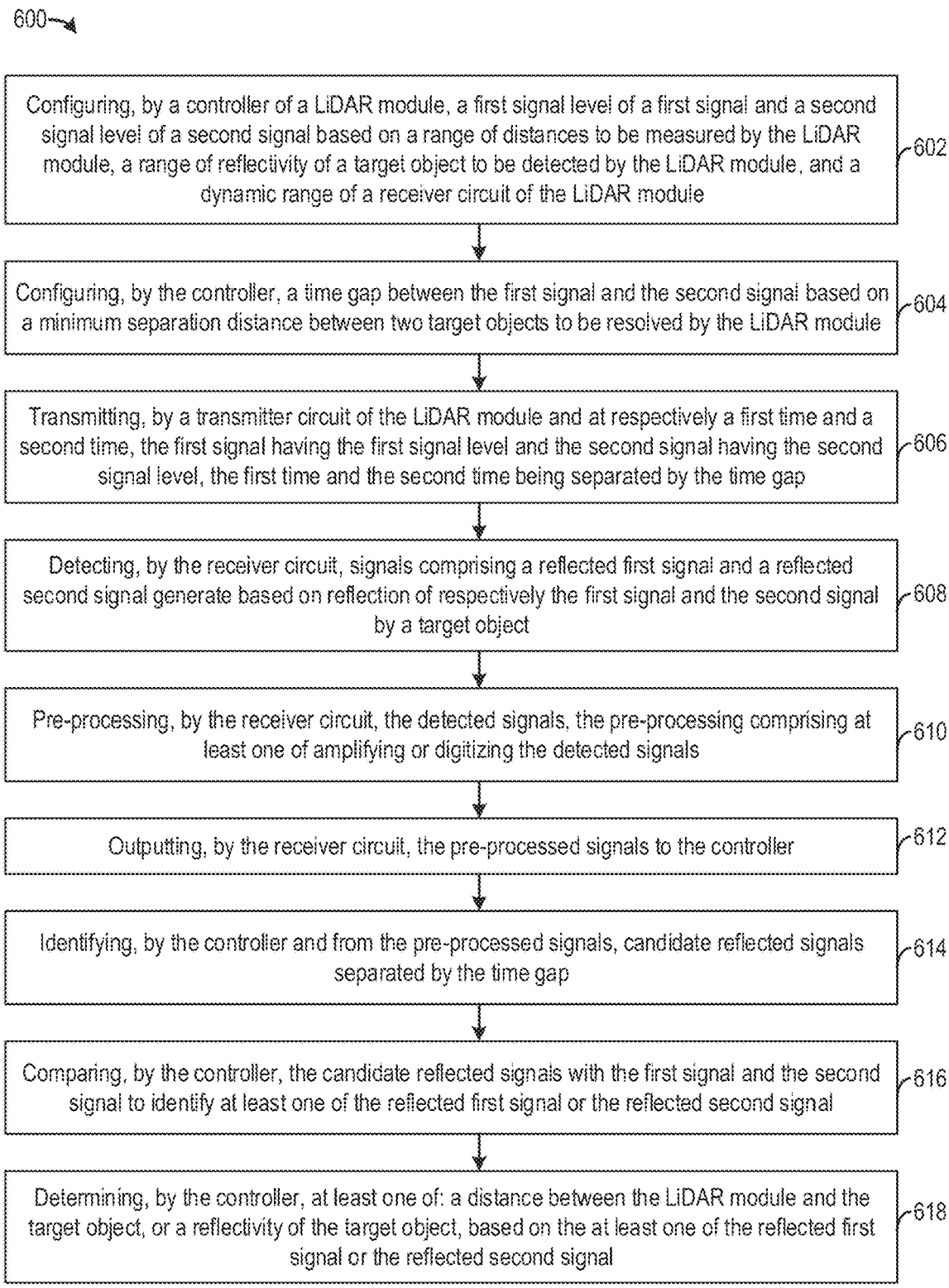
FIG. 6 illustrates a flowchart of a method for performing a ranging operation, according to certain embodiments.

FIG. 6 illustrates a flowchart of example process 600 for performing a ranging operation. Process 600 can be performed by, for example, ranging system 300. Ranging system 300 can be part of a LiDAR module and includes a transmitter circuit (e.g., transmitter 202), a receiver circuit (e.g., receiver 204), and a controller (e.g., controller 306). The receiver circuit includes a pre-processing circuit (e.g., amplifier, ADC, etc.) to pre-process detected signals for processing by the controller, and the receiver circuit has a dynamic range that defines a range of input for which an output of the pre-processing circuit is linearly related to the input.

Process 600 beings with operation 602, in which the controller configures a first signal level of a first signal and a second signal level of a second signal. The first signal level and the second signal level can be configured based on a range of distances to be measured by the LiDAR module, a range of reflectivity of a target object to be detected by the LiDAR module, and the dynamic range. For example, the first signal level can be smaller than the second signal level. For example, referring to FIG. 5A and FIG. 5B, the first signal level can be configured such that a signal level of the reflected first signal from a target object positioned at the minimum distance of the range of distances from the LiDAR module and having a maximum level of reflectivity of the range of levels of reflectivity, measured at an input of the receiver circuit, is equal to or below an upper end of the dynamic range. The second signal level can be configured such that a signal level of the reflected second signal from a target object positioned at a maximum distance of the range of distances from the LiDAR module and having a minimum level of reflectivity of the range of levels of reflectivity, measured at the input of the receiver circuit, is equal to or above a lower end of the dynamic range. Moreover, referring to FIG. 5C, the first and second signal levels can also be determined based on the maximum ratio of reflected signals from two objects separated by a predetermined separation distance (e.g., minimum separation distance to be resolved by the LiDAR module). To improve the likelihood that the controller can distinguish two signals reflected from two minimally-spaced objects from the first signal and the second signal reflected from the same object, the amplitude/power ratio between the first signal and the second signal can be set to be higher than the maximum ratio.

In operation 604, the controller configures a time gap between the first signal and the second signal based on a minimum separation distance between two target objects to be resolved by the LiDAR module. For example, as described in FIG. 4A, the time gap can be configured to ensure that reflected signals from two objects separated by more than the minimum separation distance do not overlap/interfere with each other at the receiver.

In operation 606, the transmitter circuit transmits, at respectively a first time and a second time, the first signal having the first signal level and the second signal having the second signal level. The first time and the second time being separated by the time gap. Examples of the transmission of the first signal and second signal is described in FIG. 3A and FIG. 3B.

In operation 608, the receiver circuit detects signals comprising a reflected first signal and a reflected second signal. The reflected first signal and the reflected second signal are generated based on reflection of, respectively, the first signal and the second signal by a target object.

In operation 610, the pre-processing circuit of the receiver circuit pre-processes the detected signals. The pre-processing may comprises at least one of amplifying or digitizing the detected signals, to improve the subsequent processing operations on the detected signals. For those detected signals that are within the dynamic range of the pre-processing circuit, the pre-processed signals can be linearly related to those detected signals.

In operation 612, the pre-processing circuit outputs the pre-processed signals to the controller for subsequent processing operations.

In operation 614, as part of the processing operations, the controller identifies candidate reflected signals separated by the time gap. To identify candidate reflected signals, the controller can search for detected signals that are separated by the time gap.

In operation 616, as part of the processing operations, the controller compares the candidate reflected signals with the first signal and the second signal to identify at least one of the reflected first signal or the reflected second signal. In some examples, the controller can obtain amplitude characteristics and/or frequency contents of the candidate reflected signals, and compare the amplitude characteristics and/or frequency contents of the candidate reflected signals with the amplitude characteristics and/or frequency contents of the first signal and the second signal. Based on the results of comparison, the controller can determine, for example, that a first candidate reflected signal is linearly related to the first signal, and that the first candidate reflected signal is the reflected first signal. The controller can also determine that a second candidate reflected signal is linearly related to the second signal, and that the second candidate reflected signal is the reflected second signal.

In operation 618, the controller determines at least one of: a distance between the LiDAR module and the target object, or a reflectivity of the target object, based on the at least one of the reflected first signal or the reflected second signal. For example, in a case where the reflected first signal is outside the dynamic range of the receiver circuit, the controller can determine the distance based on a time difference between the second signal and the reflected second signal. Also, in a case where the reflected second signal is outside the dynamic range of the receiver circuit, the controller can determine the distance based on a time difference between the first signal and the reflected first signal. If both the reflected first signal and the reflected second signal are within the dynamic range, the controller can determine the distance based on, for example, averaging the time differences between the first signal and the reflected first signal and between the second signal and the reflected second signal. Moreover, the controller can also determine a reflectivity of the target object based on, for example, a ratio of amplitude/power between the first signal and the reflected first signal and/or between the second signal and the reflected second signal, and Equation 1.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims. For instance, any of the embodiments, alternative embodiments, etc., and the concepts thereof may be applied to any other embodiments described and/or within the spirit and scope of the disclosure.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

What is claimed is:

1. An apparatus, the apparatus being part of a Light Detection and Ranging (LiDAR) module of a vehicle and comprising a transmitter circuit, a receiver circuit having a dynamic range that defines a range of input for which an output of the receiver circuit is linearly related to the input, and a controller;

wherein the controller is configured to:
configure a first signal level of a first signal and a second signal level of a second signal based on a range of distances to be measured by the LiDAR module, a range of reflectivity of a target object to be detected by the LiDAR module, and the dynamic range of the receiver circuit; and configure a time gap between the first signal and the second signal based on a minimum separation distance between two target objects to be resolved by the LiDAR module;

wherein the transmitter circuit is configured to transmit, respectively at a first time and a second time, the first signal having the first signal level and the second signal having the second signal level, the first time and the second time being separated by the time gap;

wherein the receiver circuit is configured to:

detect signals comprising a reflected first signal and a reflected second signal generate based on reflection of respectively the first signal and the second signal by a target object;

pre-process the detected signals, the pre-processing comprising at least one of amplifying or digitizing the detected signals; and output the pre-processed signals to the controller;

and wherein the controller is configured to:

identify, from the pre-processed signals, candidate reflected signals, the identification being based on searching for a group of pre-processed signals that are separated by the time gap;

compare the candidate reflected signals with the first signal and the second signal to identify at least one of the reflected first signal or the reflected second signal; and determine at least one of: a distance between the apparatus and the target object, or a reflectivity of the target object, based on the at least one of the reflected first signal or the reflected second signal.

2. The apparatus of claim 1, wherein the controller is configured to:

identify the reflected first signal from the candidate reflected signals;

determine a first time difference between the first signal and the reflected first signal;

determine a first time-of-flight of the first signal based on the first time difference; and determine the distance based on the first time-of-flight.

3. The apparatus of claim 2, wherein the controller is configured to:

based on determining that the reflected second signal is not within the dynamic range of the receiver circuit, determining the distance based on the first time-of-flight.

4. The apparatus of claim 2, wherein the controller is configured to:

based on determining that the reflected second signal is within the dynamic range of the receiver circuit, determining a second time-of-flight of the second signal based on a second time difference between the second signal and reflected second signal; and determining the distance based on the first time-of-flight and the second time-of-flight.

5. The apparatus of claim 1, wherein the controller is configured to, based on determining that the reflected first signal is not within the dynamic range of the receiver circuit:

identify the reflected second signal from the candidate reflected signals;

determine a second time difference between the second signal and the reflected second signal;

determine a second time-of-flight of the second signal based on the second time difference; and determine the distance based on the second time-of-flight.

6. The apparatus of claim 1, wherein the controller is configured to determine the reflectivity of the target object based on at least one of: a first ratio between the first signal level of the first signal and a third signal level of the reflected first signal, or a second ratio between the second signal level of the second signal and a fourth signal level of the reflected second signal.

7. The apparatus of claim 1, wherein:

the LiDAR module is a first LiDAR module;

the time gap is a first time gap; and the controller is configured to set the first time gap based on a second time gap between a third signal and a fourth signal transmitted by a second LiDAR module.

8. The apparatus of claim 1, wherein the controller is configured to transmit multiple groups of the first signal and the second signal; and wherein the time gap between the first signal and the second signal for each of the multiple groups is set based on a random function.

9. The apparatus of claim 1, wherein:

the first signal level is configured such that a signal level of the reflected first signal from a target object positioned at a minimum distance of the range of distances from the LiDAR module and having a maximum level of reflectivity of the range of levels of reflectivity, measured at an input of the receiver circuit, is equal to or below an upper end of the dynamic range; and the second signal level is configured such that a signal level of the reflected second signal from a target object positioned at a maximum distance of the range of distances from the LiDAR module and having a minimum level of reflectivity of the range of reflectivity, measured at the input of the receiver circuit, is equal to or above a lower end of the dynamic range.

10. The apparatus of claim 1, wherein a ratio between the first signal level and the second signal level is configured based on a ratio of signal of reflected signals generated by reflection of a signal at two target objects separated by a pre-determined distance, to enable the controller to determine whether two reflected signals are generated by reflection of a signal at two target objects or are generated by reflection of the first signal and the second signal at a single target object.

11. An apparatus, the apparatus being part of a Light Detection and Ranging (LiDAR) module of a vehicle and comprising a transmitter circuit, the transmitter circuit being configured to:

transmit a first signal having a first signal level and a second signal having a second signal level, the second signal being transmitted after the first signal, the first signal and the second signal being separated by a time gap configured based on a minimum separation distance between two target objects to be resolved by the LiDAR module, wherein the first signal level and the second signal level are configured based on a range of distances to be measured by the LiDAR module, a range of levels of reflectivity of a target object to be detected by the LiDAR module, and a dynamic range of a receiver circuit to receive the first signal and the second signal, such that at least one of a reflected first signal or a reflected second signal, generated based on reflection of respectively the first signal and the second signal by the target object, is within the dynamic range of the receiver circuit when received at the receiver circuit; and wherein the dynamic range defines a range of input for which an output of the receiver circuit is linearly related to the input.

12. An apparatus, the apparatus being part of a Light Detection and Ranging (LiDAR) module of a vehicle and comprising a receiver circuit having a dynamic range that defines a range of input for which an output of the receiver circuit is linearly related to the input, and a controller;
wherein the receiver circuit is configured to:
detect signals comprising a reflected first signal and a reflected second signal generated based on reflection of a first signal and a second signal by a target object, the first signal and the second signal being separated by a time gap configured based on a minimum separation distance between two target objects to be resolved by the LiDAR module, the first signal and the second signal having, respectively, a first signal level and a second signal level configured based on a range of distances to be measured by the LiDAR module, a range of levels of reflectivity of a target object to be detected by the LiDAR module, and the dynamic range of the receiver circuit;
pre-process the detected signals, the pre-processing comprising at least one of amplifying or digitizing the detected signals; and
output the pre-processed signals to the controller;
and wherein the controller is configured to:
identify, from the pre-processed signals, candidate reflected signals, the identification being based on searching for a group of pre-processed signals that are separated by the time gap;
compare the candidate reflected signals with the first signal and the second signal to identify at least one of the reflected first signal and the reflected second signal; and
determine at least one of: a distance between the apparatus and the target object, or a reflectivity of the target object, based on the at least one of the reflected first signal or the reflected second signal.

13. A method comprising:
configuring, by a controller of a LiDAR module, a first signal level of a first signal and a second signal level of a second signal based on a range of distances to be measured by the LiDAR module, a range of reflectivity of a target object to be detected by the LiDAR module, and a dynamic range of a receiver circuit of the LiDAR module, wherein the dynamic range defines a range of input for which an output of the receiver circuit is linearly related to the input;
configuring, by the controller, a time gap between the first signal and the second signal based on a minimum separation distance between two target objects to be resolved by the LiDAR module;
transmitting, by a transmitter circuit of the LiDAR module and at respectively a first time and a second time, the first signal having the first signal level and the second signal having the second signal level, the first time and the second time being separated by the time gap;
detecting, by the receiver circuit, signals comprising a reflected first signal and a reflected second signal generate based on reflection of respectively the first signal and the second signal by a target object;
pre-processing, by the receiver circuit, the detected signals, the pre-processing comprising at least one of amplifying or digitizing the detected signals;
outputting, by the receiver circuit, the pre-processed signals to the controller;
identifying, by the controller and from the pre-processed signals, candidate reflected signals that are separated by the time gap;
comparing, by the controller, the candidate reflected signals with the first signal and the second signal to identify at least one of the reflected first signal or the reflected second signal; and
determining, by the controller, at least one of: a distance between the LiDAR module and the target object, or a reflectivity of the target object, based on the at least one of the reflected first signal or the reflected second signal.

14. The method of claim 13, wherein determining the distance comprises:
identifying the reflected first signal from the candidate reflected signals;
determining a first time difference between the first signal and the reflected first signal;
determining a first time-of-flight of the first signal based on the first time difference; and
determining the distance between the LiDAR module and the target object based on the first time-of-flight.

15. The method of claim 14, wherein determining the distance comprises:
based on determining that the reflected second signal is not within the dynamic range of the receiver circuit, determining the distance based on the first time-of-flight.

16. The method of claim 14, wherein determining the distance comprises:
based on determining that the reflected second signal is within the dynamic range of the receiver circuit, determining a second time-of-flight of the second signal based on a second time difference between the second signal and reflected second signal; and
determining the distance based on the first time-of-flight and the second time-of-flight.

17. The method of claim 13, wherein determining the reflectivity of the target object comprises:
determining at least one of: a first ratio between the first signal level of the first signal and a third signal level of the reflected first signal, or a second ratio between the second signal level of the second signal and a fourth signal level of the reflected second signal; and
determining the reflectivity of the target object based on at least one of the first ratio or the second ratio.

18. The method of claim 13, further comprising:
transmitting, by the transmitter circuit, multiple groups of the first signal and the second signal,
wherein the time gap between the first signal and the second signal for each of the multiple groups is set based on a random function.

19. The method of claim 13, wherein:
the first signal level is configured such that a signal level of the reflected first signal from a target object positioned at the minimum distance of the range of distances from the LiDAR module and having a maximum level of reflectivity of the range of levels of reflectivity, measured at an input of the receiver circuit, is equal to or below an upper end of the dynamic range; and
the second signal level is configured such that a signal level of the reflected second signal from a target object positioned at a maximum distance of the range of distances from the LiDAR module and having a minimum level of reflectivity of the range of reflectivity, measured at the input of the receiver circuit, is equal to or above a lower end of the dynamic range.

20. The method of claim 13, wherein a ratio between the first signal level and the second signal level is configured based on a ratio of signal of reflected signals generated by reflection of a signal at two target objects separated by a pre-determined distance, to enable the controller to determine whether two reflected signals are generated by reflection of a signal at two target objects or are generated by reflection of the first signal and the second signal at a single target object.

* * * * *